(12) United States Patent
Shiro et al.

(10) Patent No.: US 10,277,644 B2
(45) Date of Patent: Apr. 30, 2019

(54) TRANSMISSION SYSTEM, TRANSMISSION TERMINAL, METHOD, AND PROGRAM

(71) Applicants: Hideki Shiro, Kanagawa (JP); Takeshi Homma, Kanagawa (JP)

(72) Inventors: Hideki Shiro, Kanagawa (JP); Takeshi Homma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/549,420

(22) PCT Filed: Mar. 7, 2016

(86) PCT No.: PCT/JP2016/001224
§ 371 (c)(1),
(2) Date: Aug. 8, 2017

(87) PCT Pub. No.: WO2016/147593
PCT Pub. Date: Sep. 22, 2016

(65) Prior Publication Data
US 2018/0041553 A1    Feb. 8, 2018

(30) Foreign Application Priority Data
Mar. 17, 2015   (JP) .................. 2015-054029

(51) Int. Cl.
*H04N 7/15* (2006.01)
*H04M 3/56* (2006.01)
(Continued)

(52) U.S. Cl.
CPC ........ *H04L 65/403* (2013.01); *H04L 12/1818* (2013.01); *H04L 65/1059* (2013.01);
(Continued)

(58) Field of Classification Search
CPC .... H04L 65/403; H04L 12/1818; H04M 3/56; H04N 7/15; H04N 7/147
(Continued)

(56) References Cited

U.S. PATENT DOCUMENTS 8,861,377 B2   10/2014   Okuyama et al.
9,503,439 B2   11/2016   Okuyama et al.
(Continued)

FOREIGN PATENT DOCUMENTS

JP   2002-041461   2/2002
JP   2006-115377   4/2006
(Continued)

OTHER PUBLICATIONS

Extended European Search Report dated Feb. 26, 2018 in Patent Application No. 16764426.9, 9 pages.
(Continued)

*Primary Examiner* — Thjuan K Addy
(74) *Attorney, Agent, or Firm* — Oblon, McClelland, Maier & Neustadt, L.L.P.

(57) ABSTRACT

A transmission system is provided. The transmission system includes a first transmission terminal and a second transmission terminal. The second transmission terminal includes an accepting unit configured to accept a destination selection, a transmission unit configured to transmit to the first transmission terminal information of the selected destination and personal account information of the second transmission terminal. The first transmission terminal includes a receiving unit configured to receive from the second transmission terminal the destination information and the personal account information of the second transmission terminal and a starting unit configured to start communication with the destination transmission terminal based on the received information.

7 Claims, 23 Drawing Sheets

(51) Int. Cl.
*H04N 7/14* (2006.01)
*H04L 29/06* (2006.01)
*H04L 12/18* (2006.01)
*H04W 4/80* (2018.01)
*H04W 88/04* (2009.01)
*H04W 8/20* (2009.01)

(52) U.S. Cl.
CPC ...... *H04L 65/1069* (2013.01); *H04L 65/4038* (2013.01); *H04L 65/80* (2013.01); *H04M 3/56* (2013.01); *H04M 3/567* (2013.01); *H04N 7/147* (2013.01); *H04N 7/15* (2013.01); *H04W 4/80* (2018.02); *H04W 8/20* (2013.01); *H04W 88/04* (2013.01)

(58) Field of Classification Search
USPC ............ 379/202.01, 201.01, 207.02, 203.01, 379/204.01, 205.01, 207.13, 207.11; 705/42
See application file for complete search history.

(56) References Cited

U.S. PATENT DOCUMENTS

| | | |
|---|---|---|
| 2006/0023651 A1 | 2/2006 | Tsuchiuchi et al. |
| 2009/0325491 A1 | 12/2009 | Bell et al. |
| 2012/0069132 A1 | 3/2012 | Kato |
| 2013/0060689 A1* | 3/2013 | Oskolkov .............. G06Q 20/10 705/42 |
| 2015/0106887 A1* | 4/2015 | Aslund ............... H04L 63/0492 726/5 |
| 2015/0304361 A1 | 10/2015 | Tamura |
| 2016/0255666 A1 | 9/2016 | Bell et al. |

FOREIGN PATENT DOCUMENTS

| | | |
|---|---|---|
| JP | 2007-214882 | 8/2007 |
| JP | 2008-244856 | 10/2008 |
| JP | 2013-085208 | 5/2013 |
| JP | 2013-93776 A | 5/2013 |
| JP | 2014-075074 | 4/2014 |
| JP | 2014-099837 | 5/2014 |
| WO | 2014/069671 A1 | 5/2014 |

OTHER PUBLICATIONS

Jonathan M. McCune, et al. "Seeing-Is-Believing: Using Camera Phones for Human-Verifiable Authentication", IEEE Symposium on Security and Privacy, XP010798367, 2005, pp. 1-15.

"Lotus Notes Basics Getting Started with Lotus Notes Mail and Calendar at UNLV", Office of Information Technology University of Nevada, Las Vegas, http://sysapps.univ.edu/sysapps/DownloadDocs/LOTUSNOTESBASICSMANUAL.pdf, XP007913467, 1998, pp. 1-64.

International Search Report and Written Opinion dated May 24, 2016 in PCT/JP2016/001224 filed on Mar. 7, 2016.

* cited by examiner

[Fig. 1]
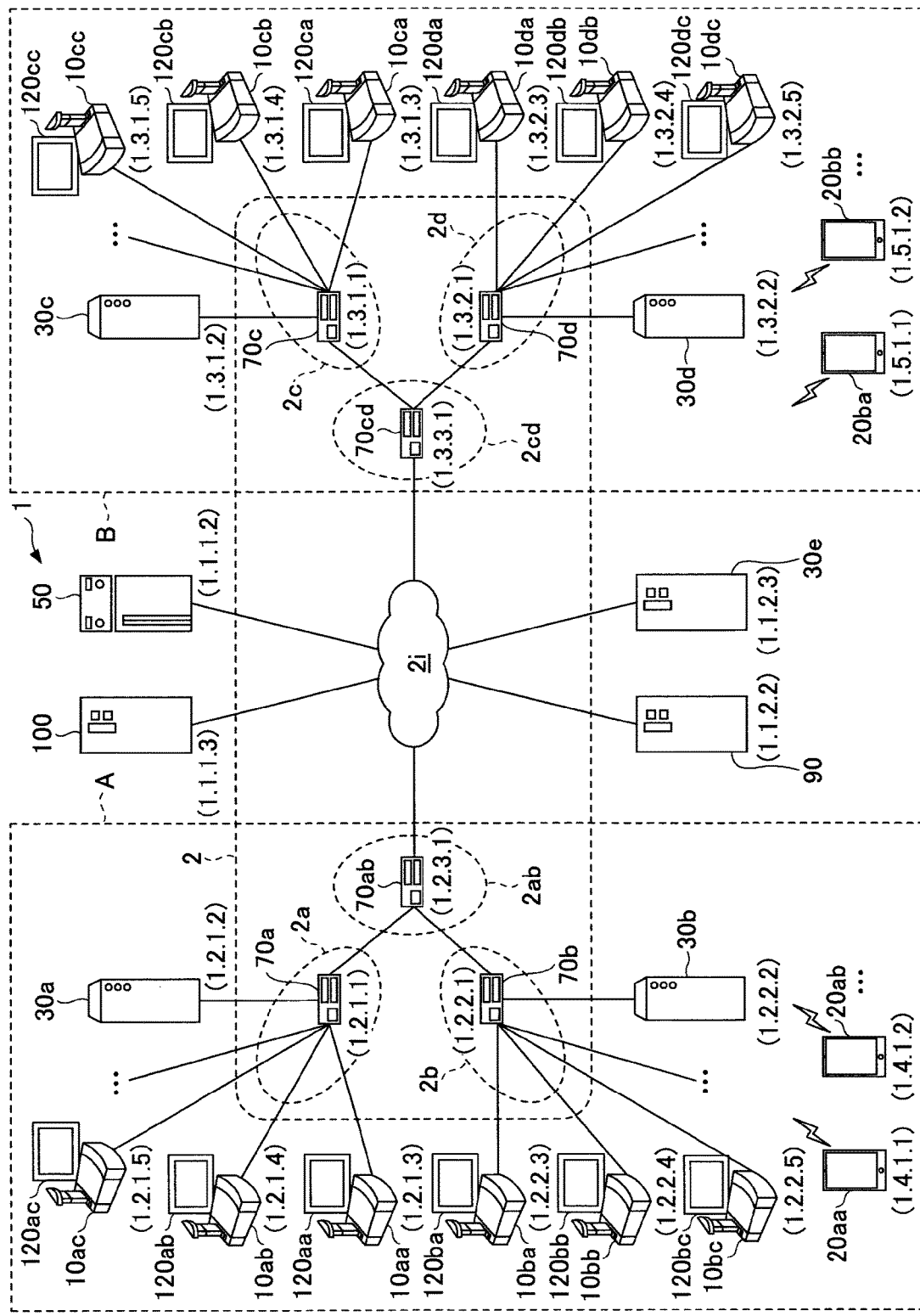

[Fig. 2]
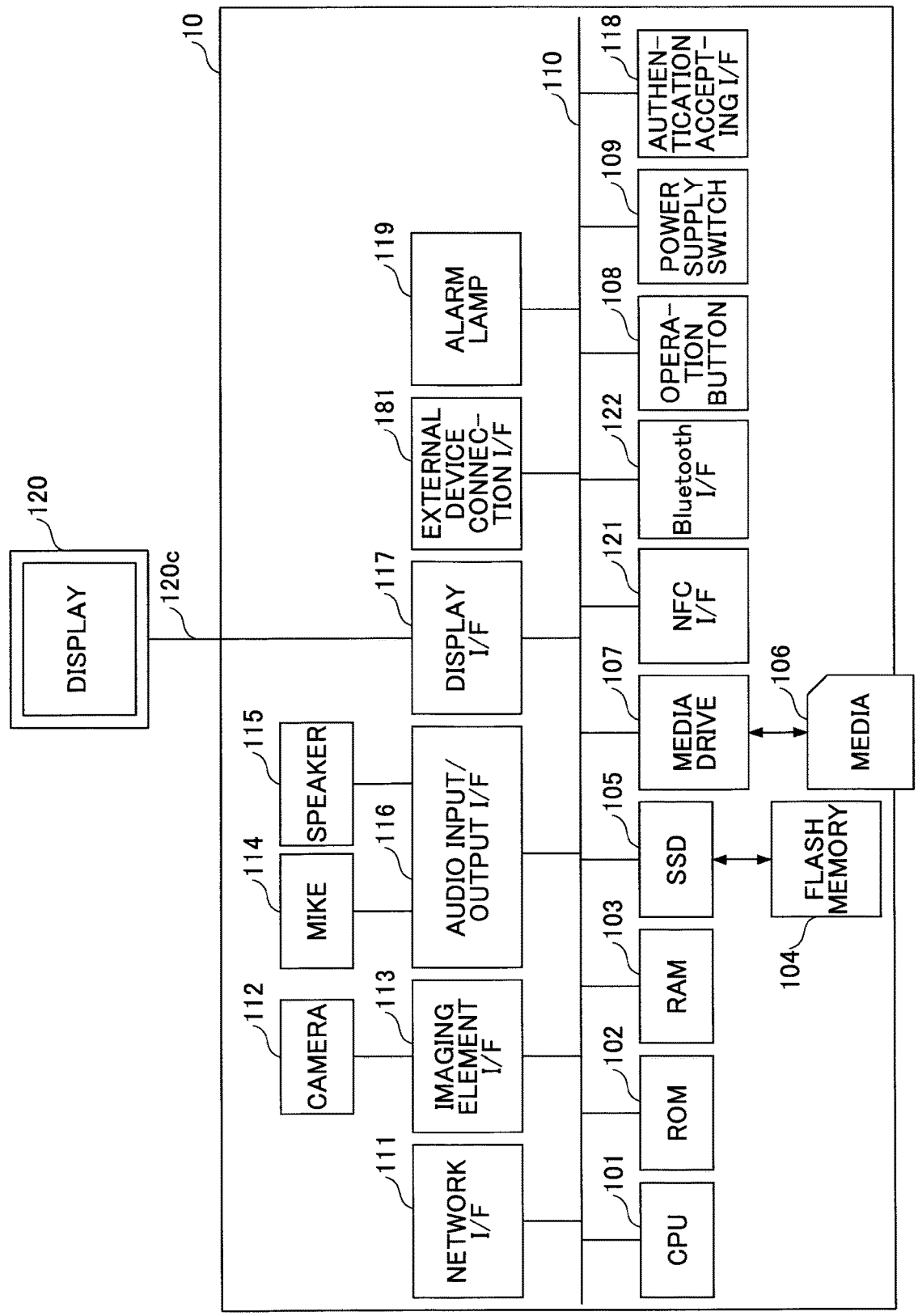

[Fig. 3]
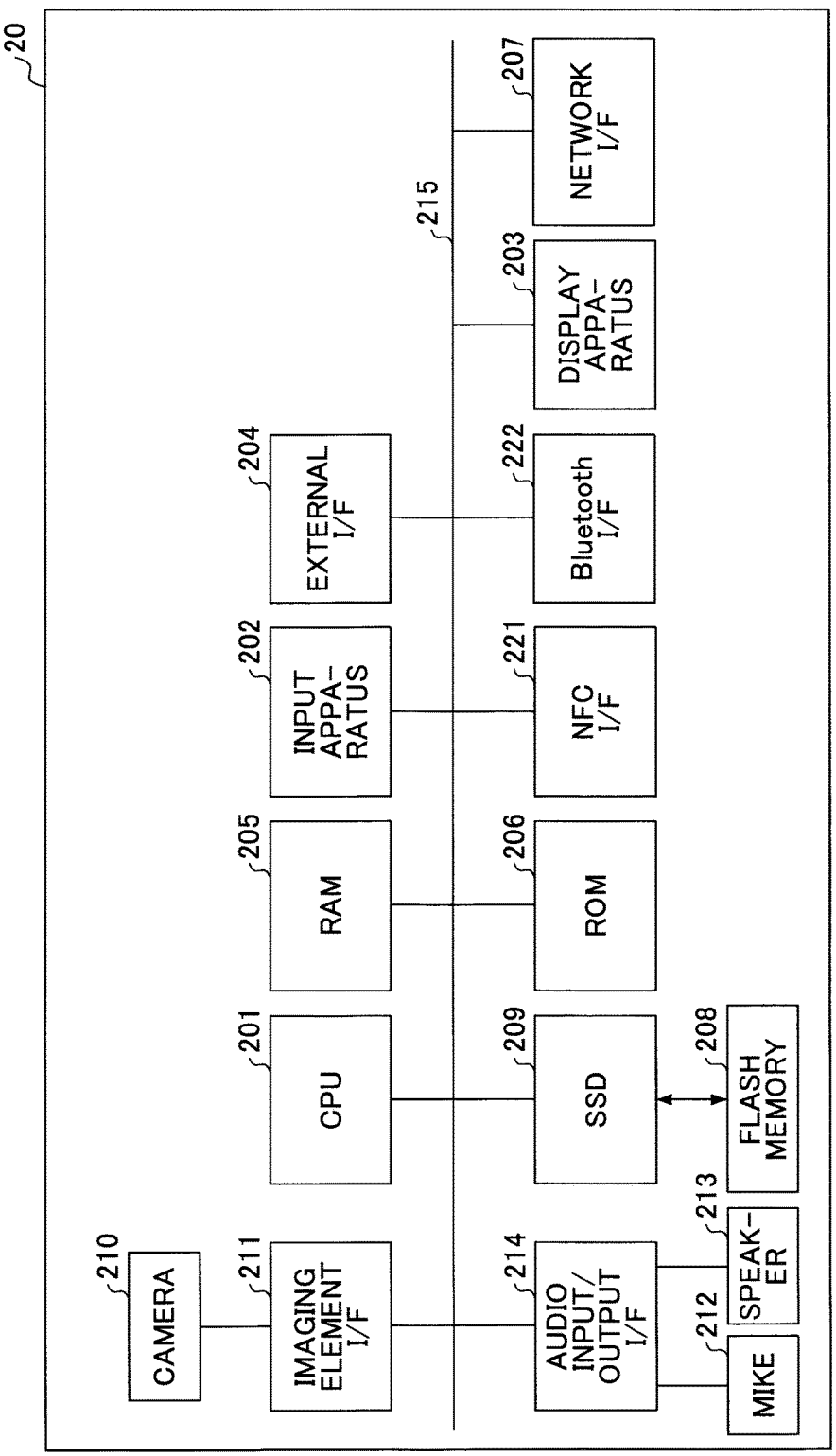

[Fig. 4]
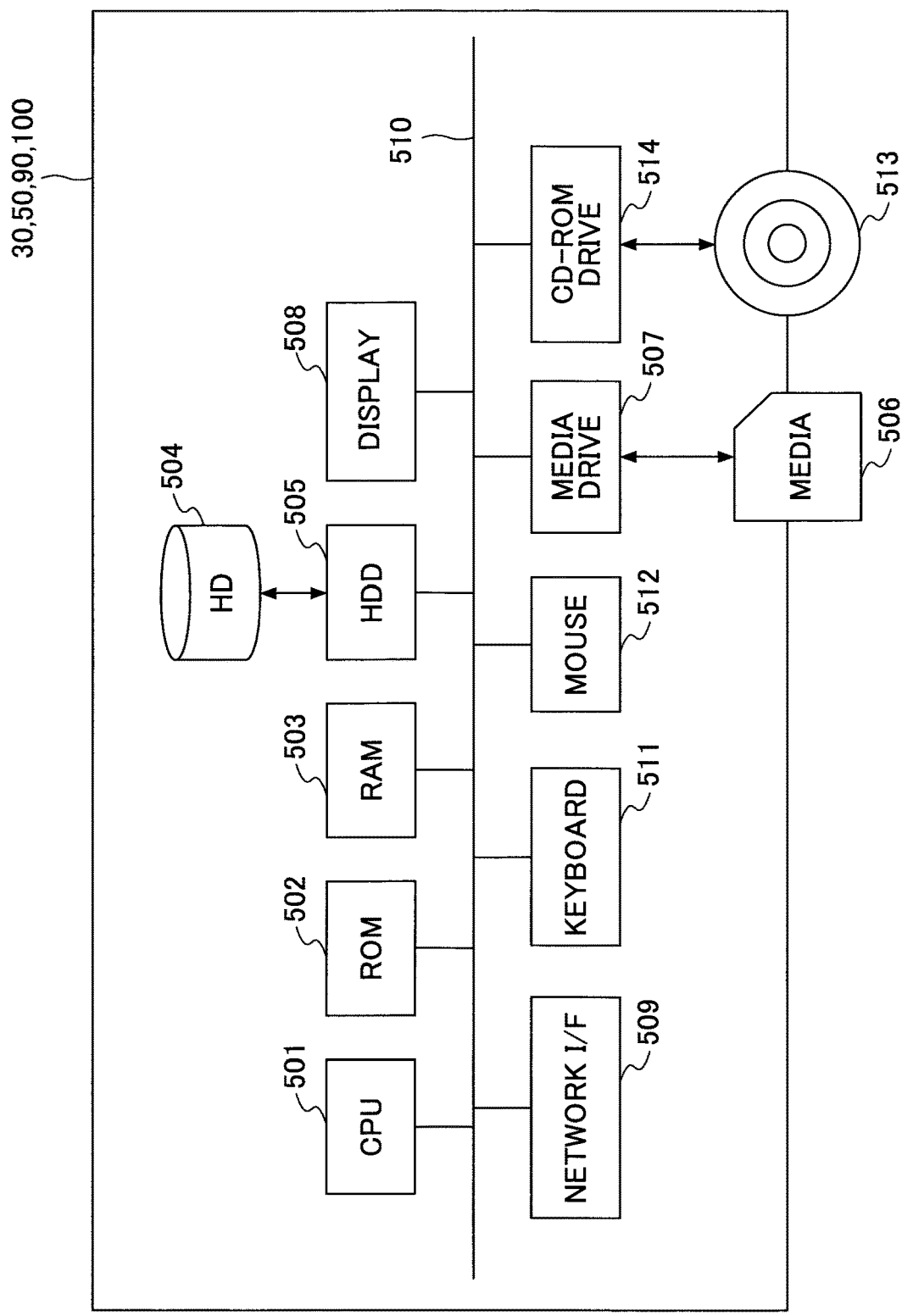

[Fig. 5]
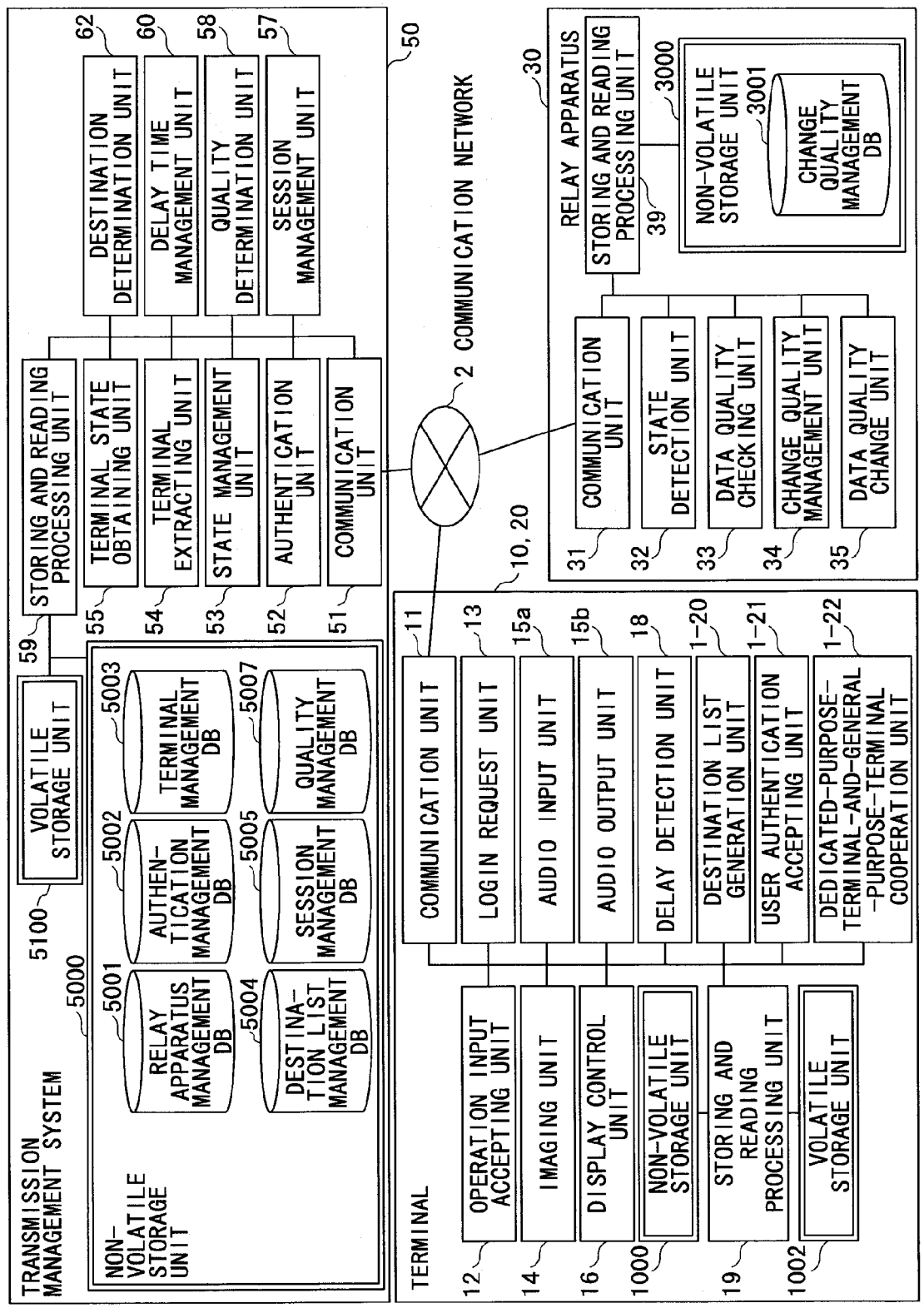

[Fig. 6]

| TERMINAL ID | PASSWORD |
|---|---|
| 10aa | aaaa |
| 10ab | abab |
| 10ba | baba |
| 10db | xxxyyy |
| ... | ... |
| 100cd | aaaa |
| 100cf | abab |
| 100cg | baba |
| ... | ... |

[Fig. 7]

| TERMINAL ID | TERMINAL NAME | OPERATING STATE | RECEIVE DATE AND TIME | IP ADDRESS OF TERMINAL |
|---|---|---|---|---|
| 10aa | JAPAN TOKYO OFFICE TERMINAL AA | ONLINE (COMMUNICATION AVAILABLE) | 2009.11.10.13:40 | 1.2.1.3 |
| 10ab | JAPAN TOKYO OFFICE TERMINAL AB | OFFLINE | 2009.11.09.12:00 | 1.2.1.4 |
| ... | ... | ... | ... | ... |
| 10ba | JAPAN OSAKA OFFICE TERMINAL BA | ONLINE (COMMUNICATION AVAILABLE) | 2009.11.10.13:45 | 1.2.2.3 |
| 10bb | JAPAN OSAKA OFFICE TERMINAL BB | ONLINE (TEMPORARILY INTERRUPTED) | 2009.11.10.13:50 | 1.2.2.4 |
| ... | ... | ... | ... | ... |
| 10ca | AMERICA NEW YORK OFFICE TERMINAL CA | OFFLINE | 2009.11.10.12:45 | 1.3.1.3 |
| 10cb | AMERICA NEW YORK OFFICE TERMINAL CB | ONLINE (COMMUNICATING) | 2009.11.10.13:55 | 1.3.1.4 |
| ... | ... | ... | ... | ... |
| 10da | AMERICA WASHINGTON OFFICE TERMINAL DA | ONLINE (COMMUNICATING) | 2009.11.08.12:45 | 1.3.2.3 |
| 10db | AMERICA WASHINGTON OFFICE TERMINAL DB | ONLINE (COMMUNICATION AVAILABLE) | 2009.11.10.12:45 | 1.3.2.4 |
| ... | ... | ... | ... | ... |

[Fig. 8]

| TERMINAL ID | DESTINATION TERMINAL ID |
|---|---|
| 10aa | 10ab,10ac,10ad,10ae |
| 10ab | 10aa,10ca,10cb |
| 10ba | 10aa,10ab,10ca,10cb,10da,10db |
| ... | ... |
| 100cd | 10gj,10kb,10tk |
| 100cf | 10dd,10cg |
| 100cg | 10af,10cd,10cc |
| 10db | 10aa,10cb,10ad |
| ... | ... |

[Fig. 9]
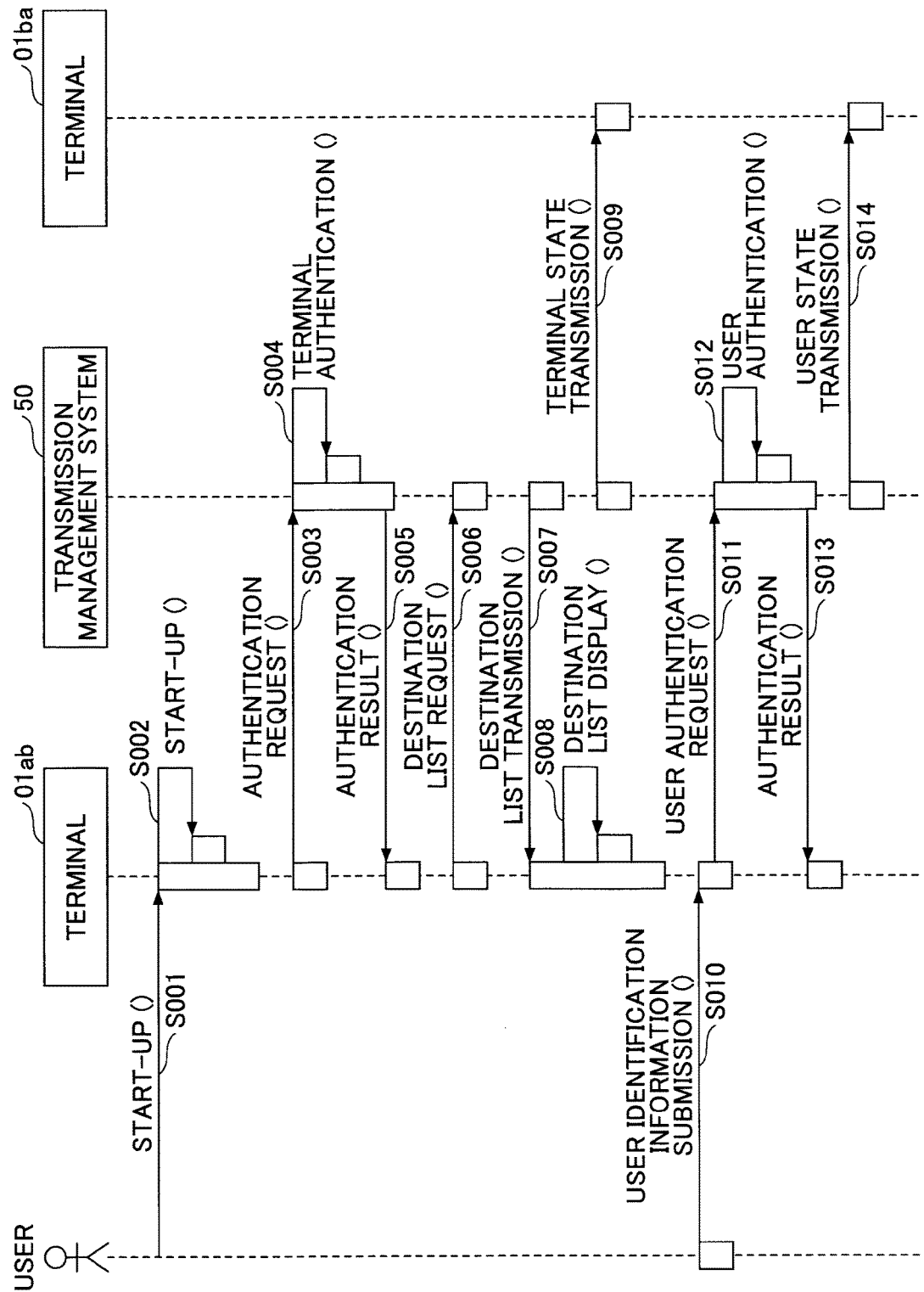

[Fig. 10]
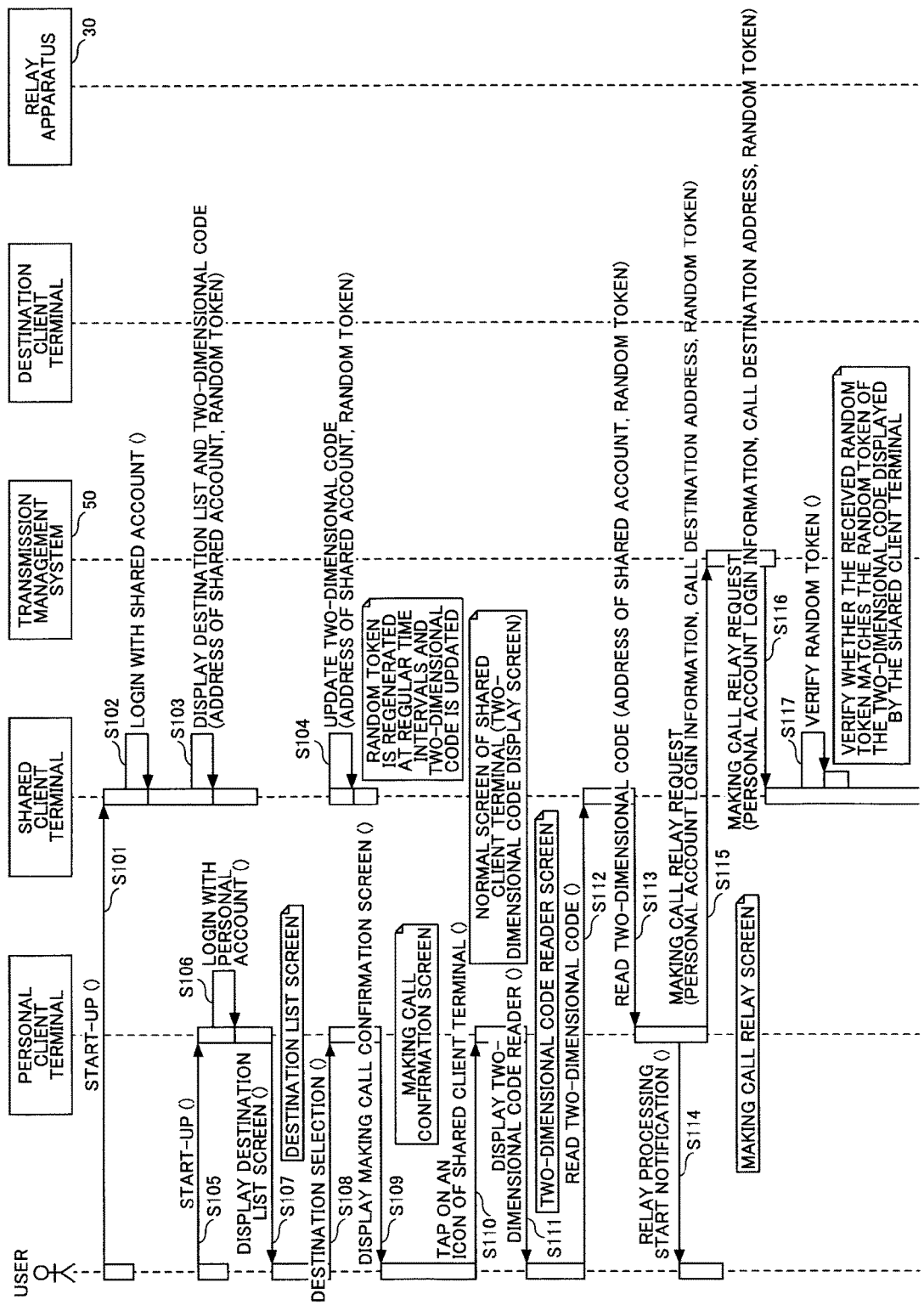

[Fig. 11]
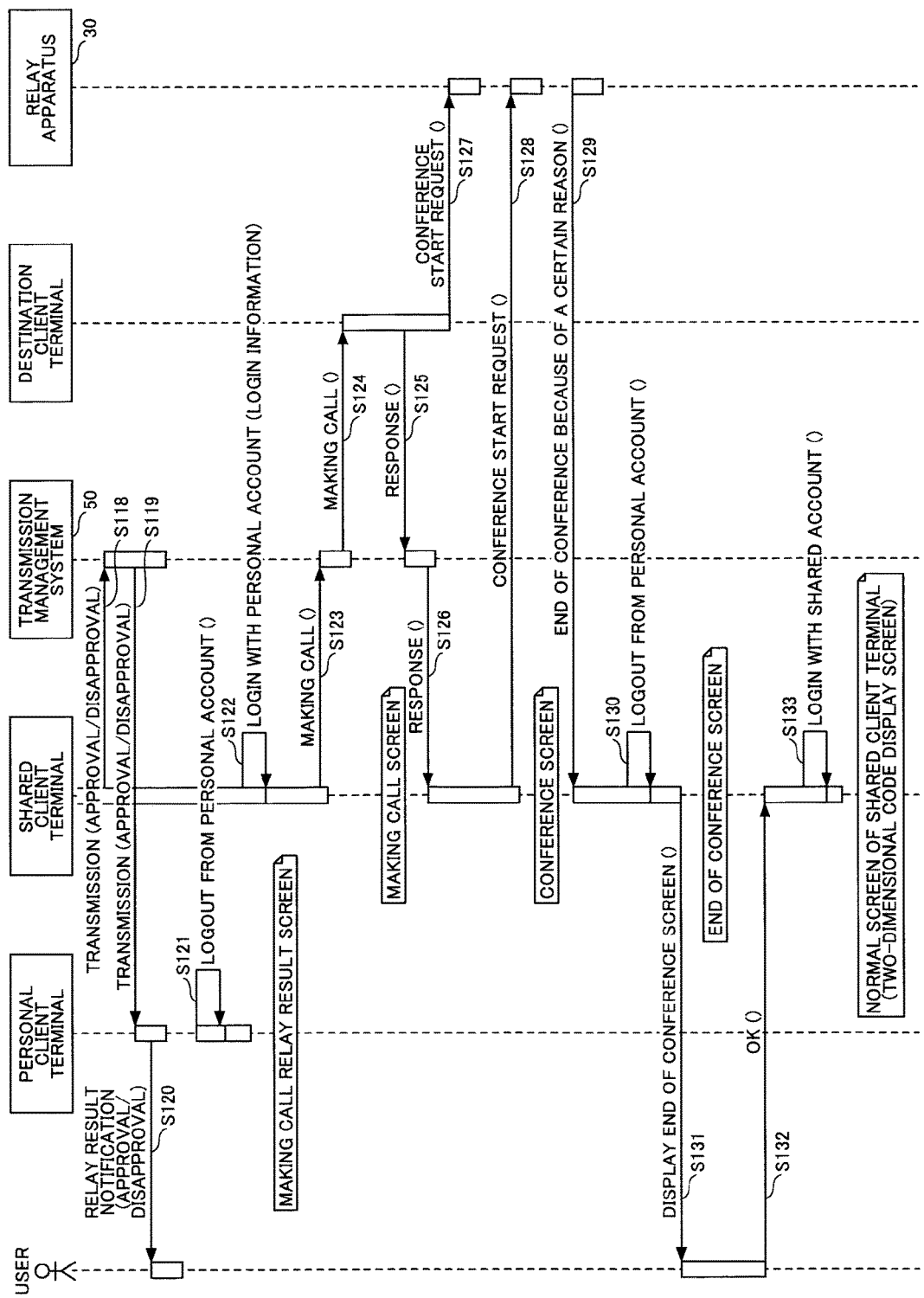

[Fig. 12]
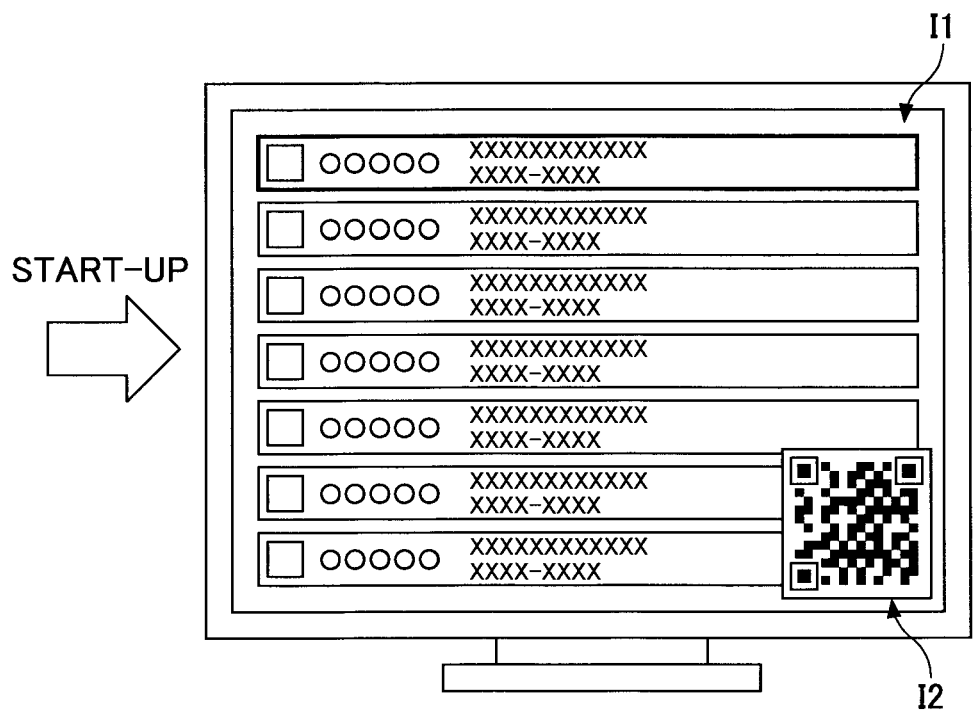
[Fig. 13]
```
ADDRESS: foo@example.com
RANDOM_TOKEN: q32a4wse6drf34tgyhuj
PUBLIC_KEY: yryr98dauf48hjqu93u0u
```

[Fig. 14]
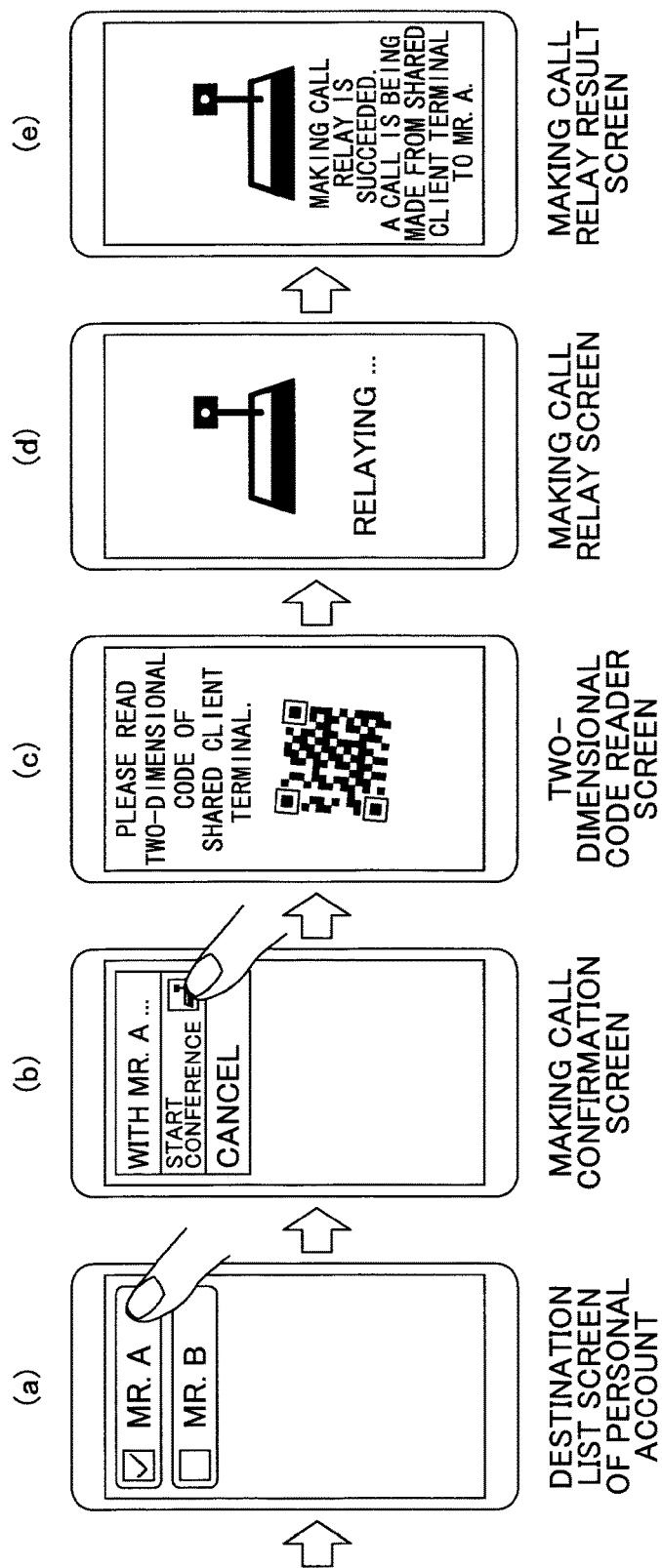

[Fig. 15]
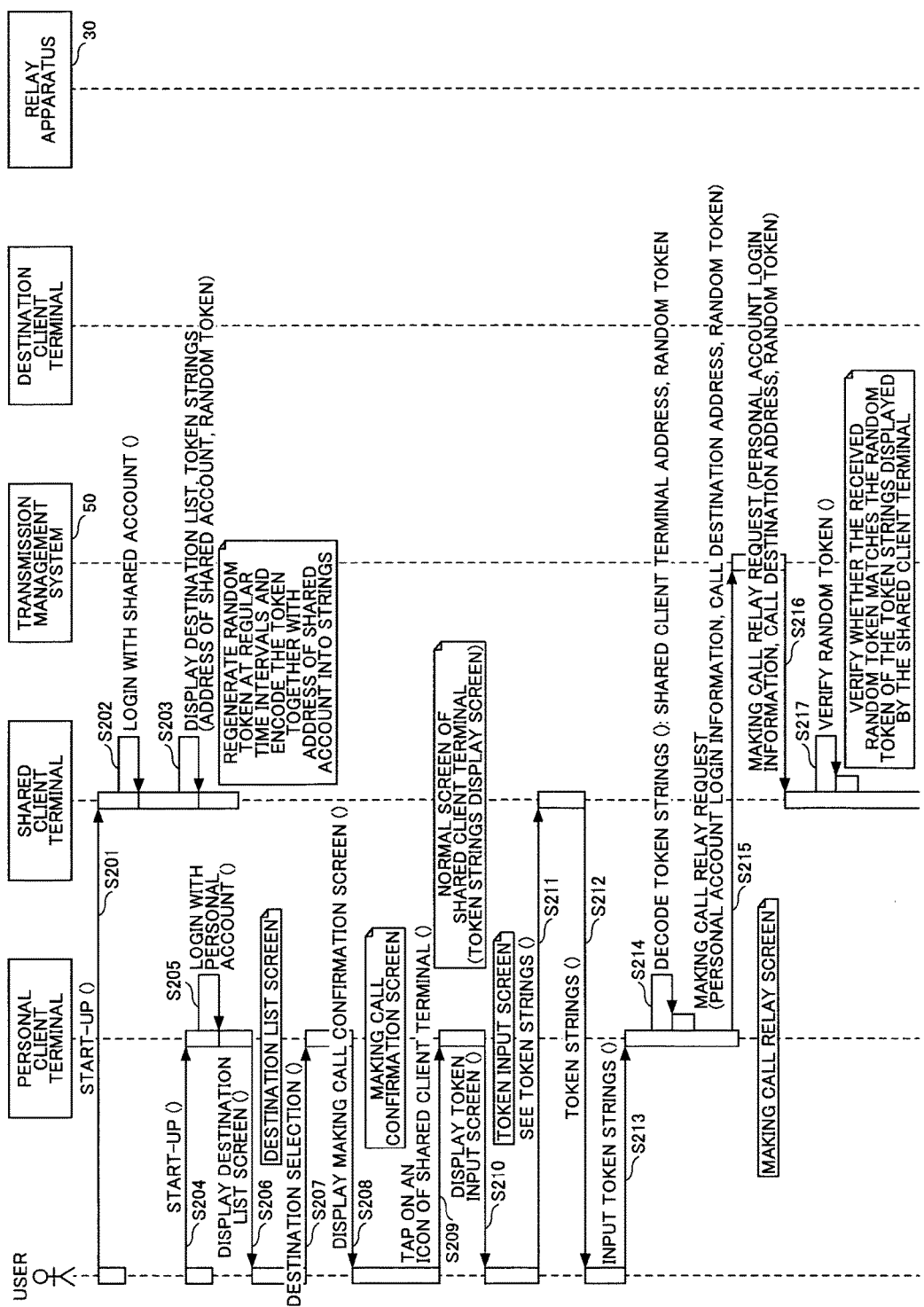

[Fig. 16]
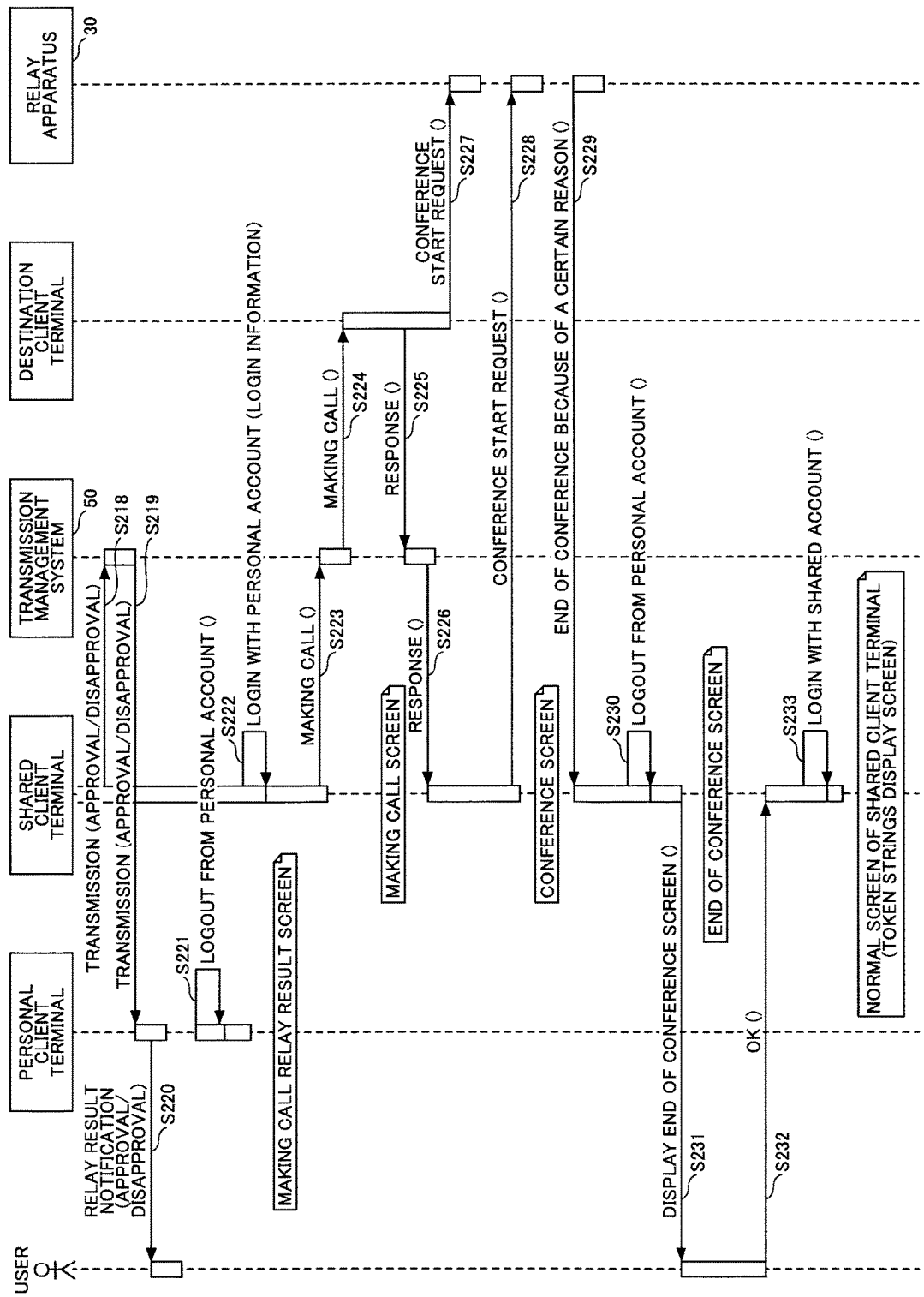

[Fig. 17]
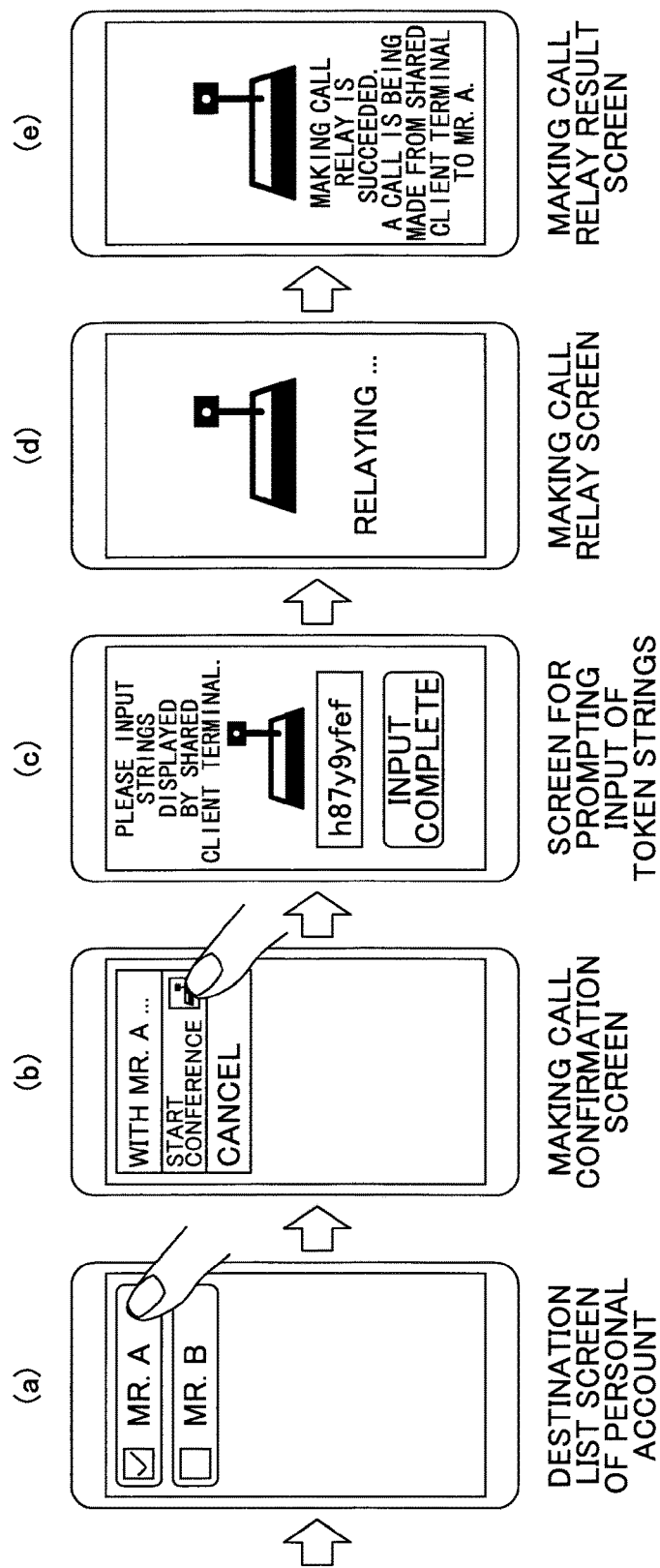

[Fig. 18]
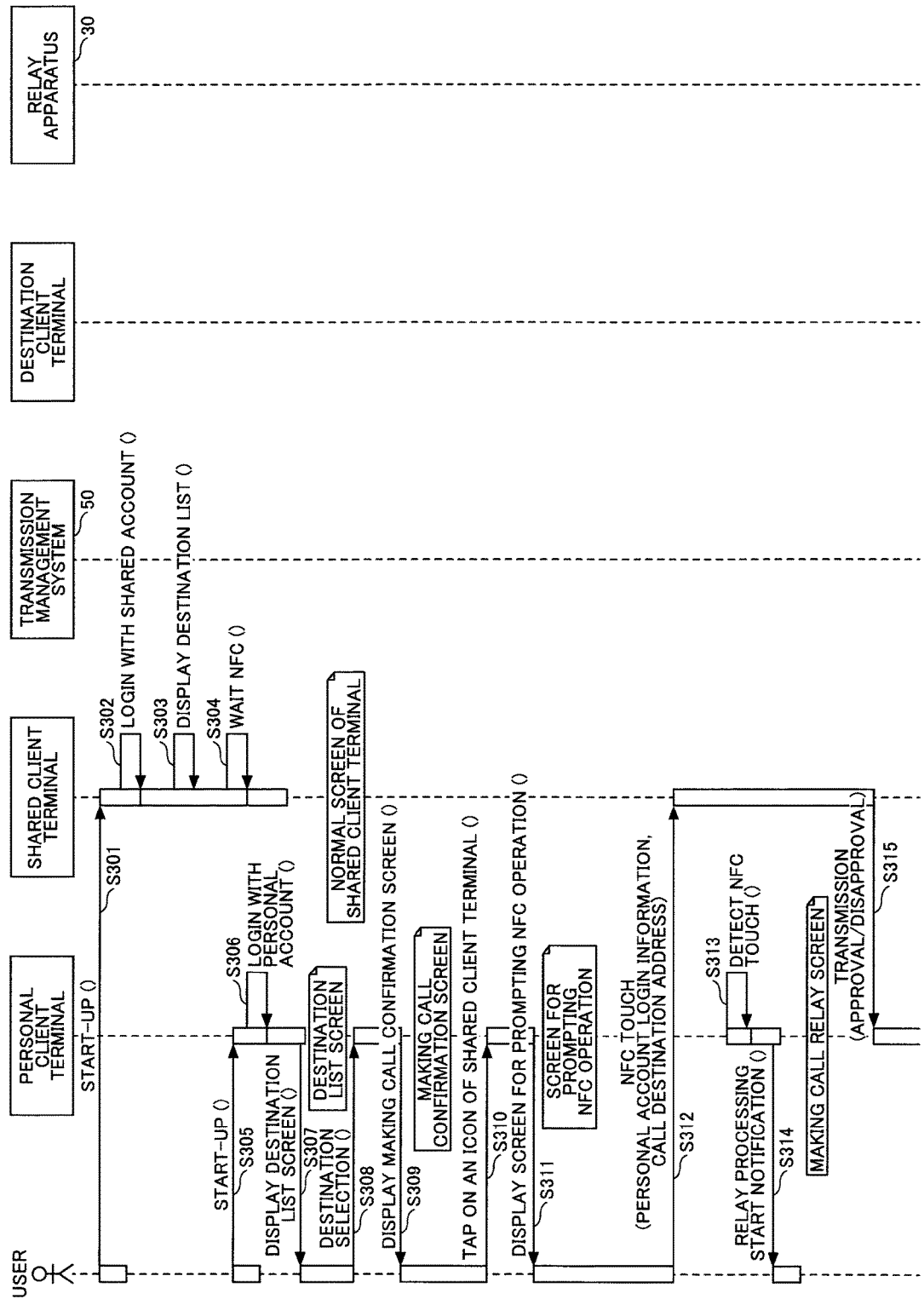

[Fig. 19]
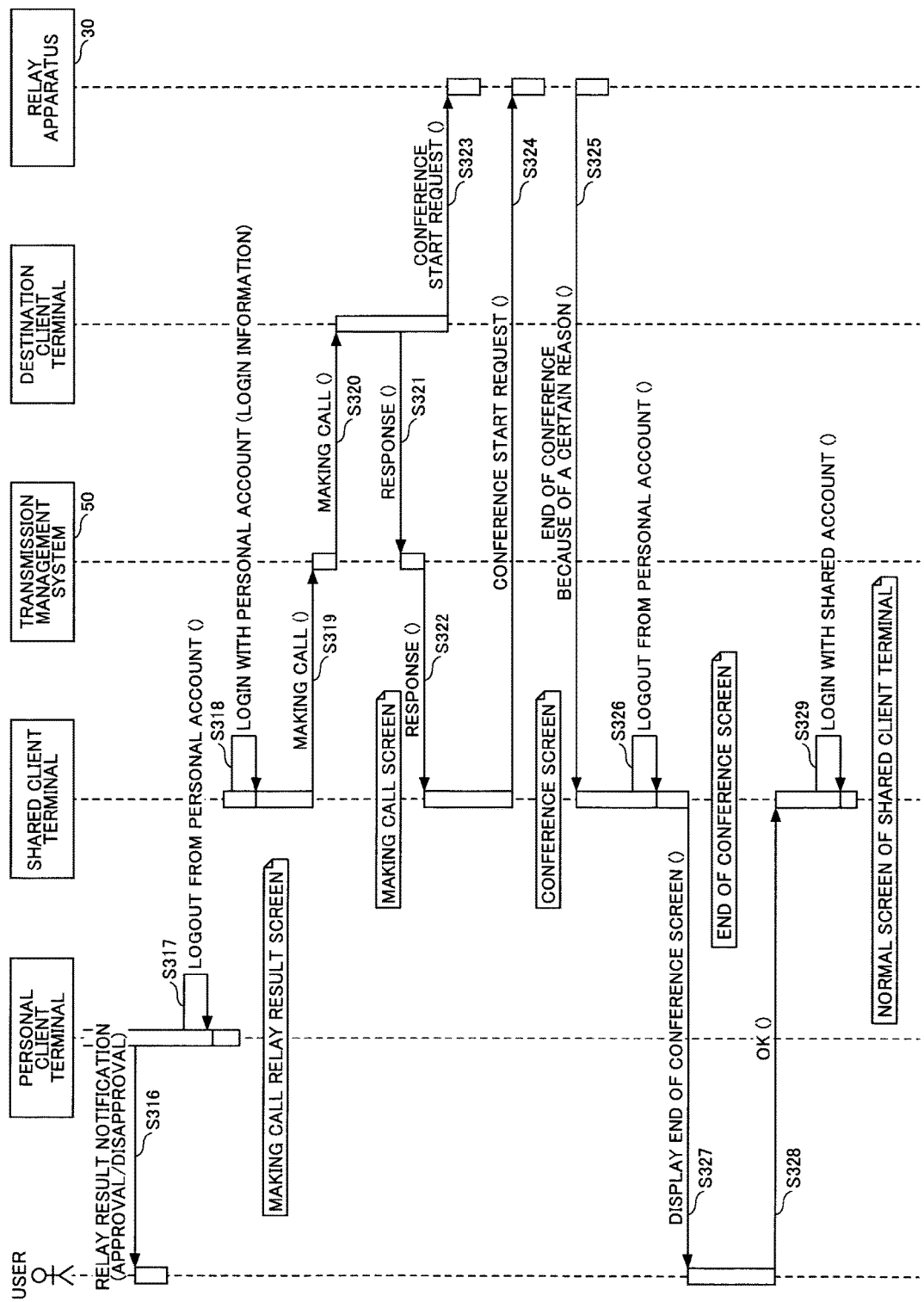

[Fig. 20]
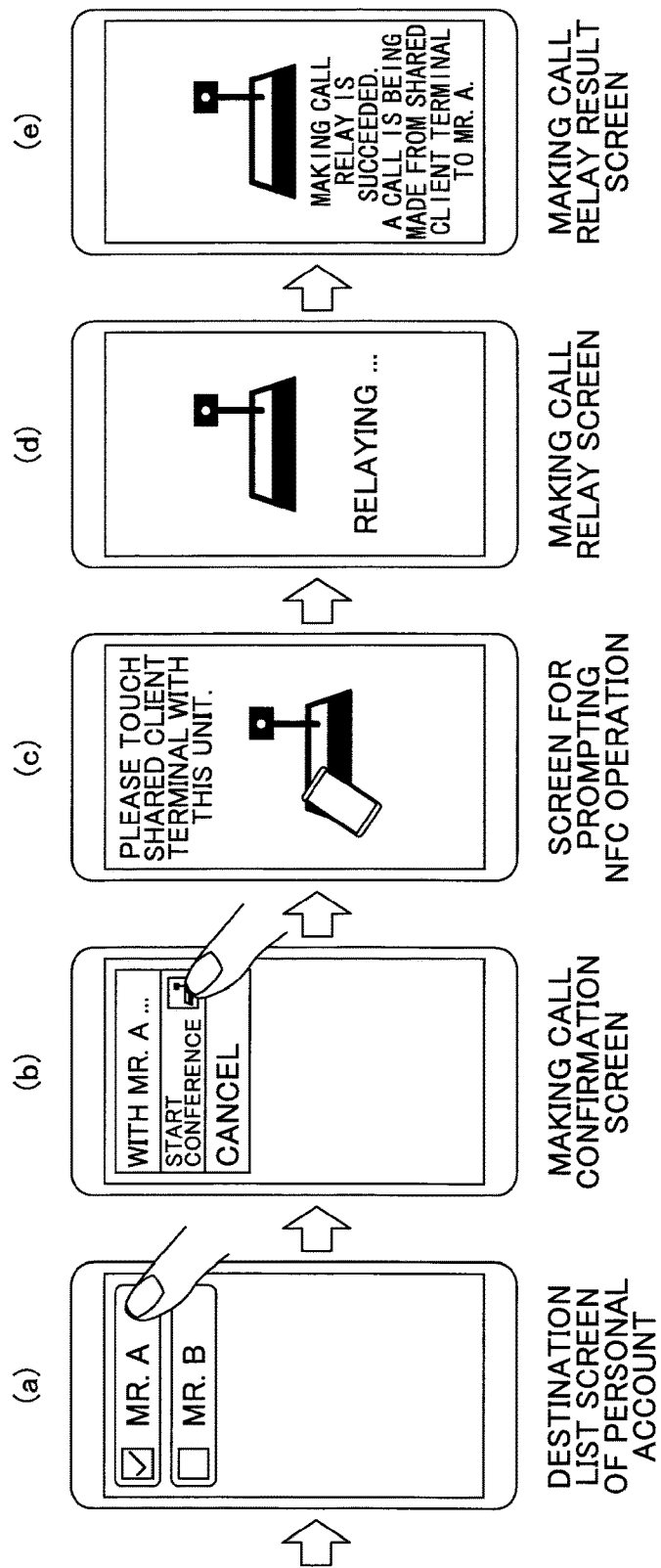

[Fig. 21]
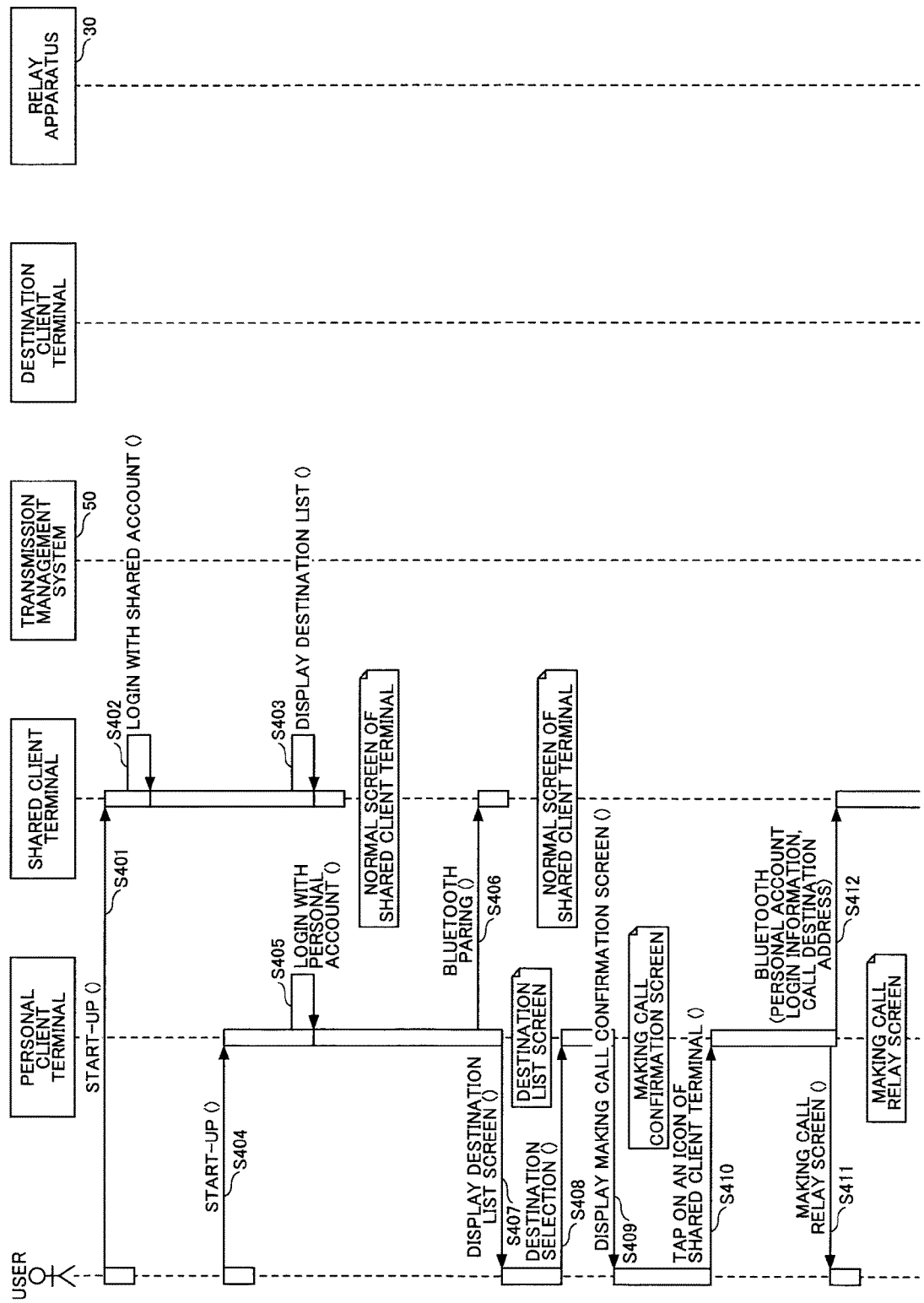

[Fig. 22]
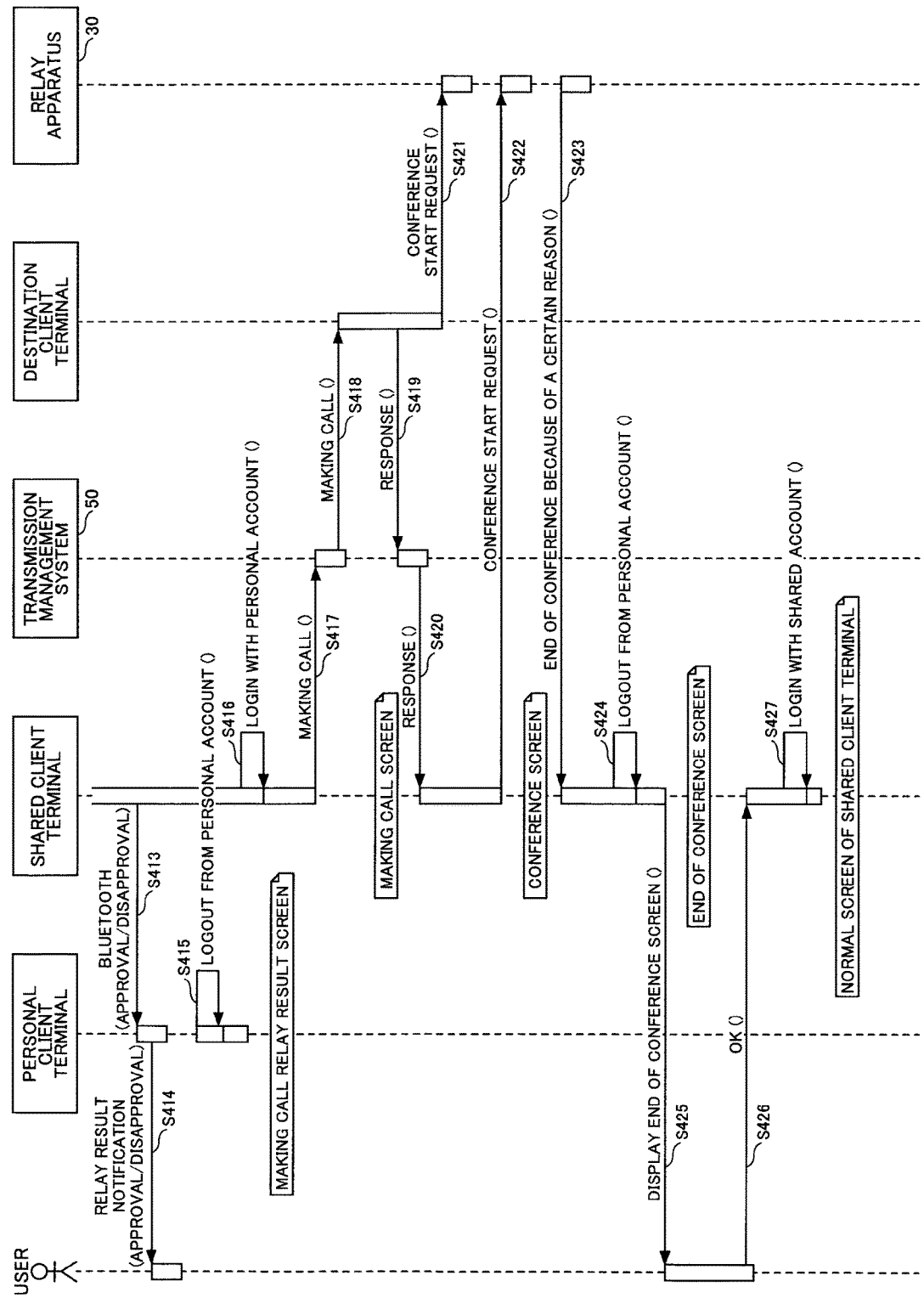

[Fig. 23]
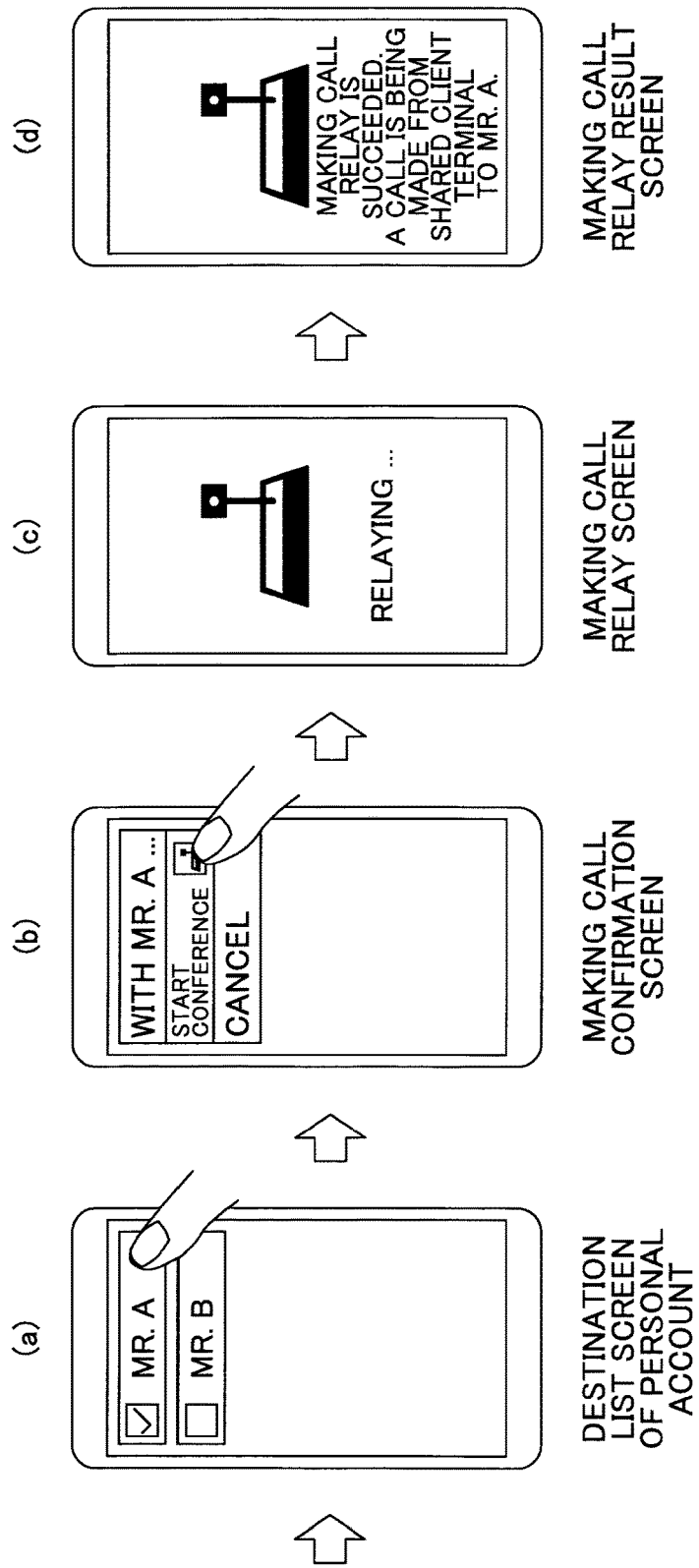

[Fig. 24]
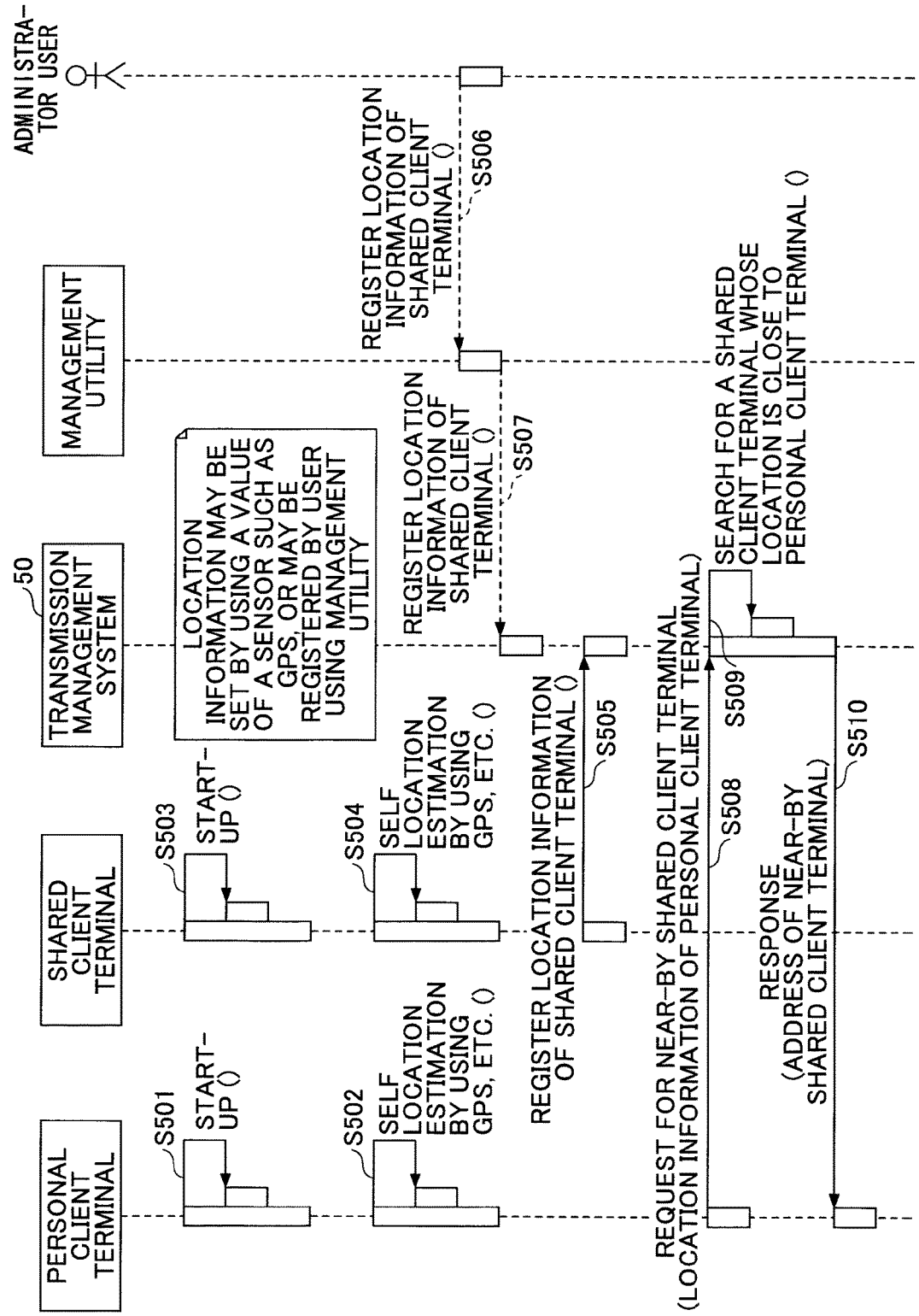

TRANSMISSION SYSTEM, TRANSMISSION TERMINAL, METHOD, AND PROGRAM

TECHNICAL FIELD

The present invention relates to a transmission system, a transmission terminal, a method, and a program.

BACKGROUND ART

With the progress of network environments, remote communications such as video conferences have been widely used.

As a transmission terminal for performing such remote communications, a dedicated-purpose terminal is used whose function is dedicated to, for example, a video conference. Such a dedicated-purpose terminal may be shared by a plurality of users in an office by using a shared account.

However, because it is difficult to provide a user specific communication with the shared account, a personal account is beginning to be allowed to be used for the dedicated-purpose terminal (refer to, for example, Patent Document 1).

Further, with the wide spread of mobile terminals (general-purpose terminals) such as a smart-phone, the general-purpose terminals are beginning to be allowed to be used for remote communication services such as a video conference in place of the dedicated-purpose terminals.

CITATION LIST

Patent Literature

[PTL 1] Japanese Laid-Open Patent Application No. 2014-075074

SUMMARY OF INVENTION

Technical Problem

As described above, it is possible for a general-purpose terminal such as a smart-phone, similar to the dedicated-purpose terminal, to perform making and receiving a call to conduct a video conference. However, there is also a strong desire for conducting a video conference by using a dedicated-purpose terminal in the case where the dedicated-purpose terminal is around because the dedicated-purpose terminal may often demonstrate better performance with its camera, display, speaker, or the like.

In this case, a user uses the dedicated-purpose terminal by using a personal account. In general, a destination list is maintained and associated with an account by a server, and is provided to the terminal as a result of a log-in operation. Therefore, the destination list of the user is displayed on the shared dedicated-purpose terminal, and there is a risk in that the destination list may be seen by other users. Further, there is a risk in that the user's personal account may be illegally used while the user is away from the terminal just for a short time. Therefore, the user cannot help hesitating to use the personal account when using the dedicated-purpose terminal.

In view of the above problem, an object of the present invention is to achieve a safe usage of a dedicated-purpose terminal while using a personal account based on a cooperation of a dedicated-purpose terminal and a general-purpose terminal.

Solution to Problem

The present invention provides a transmission system including a first transmission terminal, and a second transmission terminal. The second transmission terminal includes an accepting unit configured to accept a destination selection, and a transmission unit configured to transmit to the first transmission terminal information of the selected destination and personal account information of the second transmission terminal. The first transmission terminal includes a receiving unit configured to receive from the second transmission terminal the destination information and the personal account information of the second transmission terminal, and a starting unit configured to start a communication with the destination transmission terminal based on the received information.

Advantageous Effects of Invention

According to the present invention, it is possible to safely use a personal account for using a dedicated-purpose terminal by having cooperation between the dedicated-purpose terminal and a general-purpose terminal.

BRIEF DESCRIPTION OF DRAWINGS

FIG. 1 is a schematic diagram of a transmission system according to an embodiment.

FIG. 2 is a hardware configuration diagram of an example of a dedicated-to-video-conference terminal according to an embodiment.

FIG. 3 is a hardware configuration diagram of an example of a mobile terminal according to an embodiment.

FIG. 4 is a hardware configuration diagram of a transmission management system, a relay apparatus, a program providing system, or a maintenance system according to an embodiment.

FIG. 5 is a functional block diagram of a terminal, an apparatus, and a system included in a transmission system according to an embodiment.

FIG. 6 is an example of an authentication management table.

FIG. 7 is an example of a terminal management table.

FIG. 8 is an example of a destination list management table.

FIG. 9 is a sequence diagram illustrating a process example when a terminal is started.

FIG. 10 is a sequence diagram (No. 1-1) illustrating a process example of an embodiment.

FIG. 11 is a sequence diagram (No. 1-2) illustrating a process example of an embodiment.

FIG. 12 is a drawing illustrating an example of a destination list and a two-dimensional code on a screen.

FIG. 13 is a drawing illustrating an example of data embedded in the two-dimensional code.

FIG. 14 is a drawing (No. 1) illustrating an operation example for selecting a destination and starting to make a call.

FIG. 15 is a sequence diagram (No. 2-1) illustrating a process example of an embodiment.

FIG. 16 is a sequence diagram (No. 2-2) illustrating a process example of an embodiment.

FIG. 17 is a drawing (No. 2) illustrating an operation example for selecting a destination and starting to make a call.

FIG. 18 is a sequence diagram (No. 3-1) illustrating a process example of an embodiment.

FIG. 19 is a sequence diagram (No. 3-2) illustrating a process example of an embodiment.

FIG. 20 is a drawing (No. 3) illustrating an operation example for selecting a destination and starting to make a call.

FIG. 21 is a sequence diagram (No. 4-1) illustrating a process example of an embodiment.

FIG. 22 is a sequence diagram (No. 4-2) illustrating a process example of an embodiment.

FIG. 23 is a drawing (No. 4) illustrating an operation example for selecting a destination and starting to make a call.

FIG. 24 is a sequence diagram (No. 5) illustrating a process example of an embodiment.

DESCRIPTION OF EMBODIMENTS

In the following, preferable embodiments of the present invention will be described.

<<Overall Configuration of Transmission System>>

FIG. 1 is a schematic diagram of a transmission system 1 according to an embodiment of the present invention. Referring to FIG. 1, an outline of the embodiment will be described.

The transmission system 1 includes a data providing system in which content data are transmitted in one direction from a first transmission terminal to a second transmission terminal via a transmission management system, and a communication system in which information including emotional information or the like is transmitted among a plurality of transmission terminals via the transmission management system. The above communication system is a system for transmitting information including emotional information among a plurality of communication terminals (corresponding to "transmission terminals") via a communication management system (corresponding to "transmission management system"). As an example of the communication system, a video conference system, a video phone system, an audio conference system, an audio phone system, a personal computer (PC) screen sharing system, or the like can be listed.

In the embodiment, it is assumed that a video conference system is an example of the communication system, a video conference management system is an example of the communication management system, and a video conference terminal is an example of a communication terminal. A transmission system 1, transmission management system 50 and transmission terminal 10 will be described. In other words, the transmission system 10 of the embodiment may be applied not only to the video conference system, but also to the communication system, the transmission system, etc.

The transmission system 1 in FIG. 1 includes a plurality of transmission terminals (10aa, 10ab, . . . ) as dedicated-to-video-conference terminals (dedicated-purpose terminals), displays (120aa, 120ab, . . . ) of the transmission terminals (10aa, 10ab, . . . ), a plurality of transmission terminals (20aa, 20ab, . . . ) as general-purpose terminals including mobile terminals (general-purpose terminals), a plurality of relay apparatuses (30a, 30b, 30c, 30d, 30e), a transmission management system 50, a program providing system 90, and a maintenance system 100. It should be noted that, in the following, "transmission terminal" may be simply referred to as "terminal", and "transmission management system" may be simply referred to as "management system".

It should be noted that, in the embodiment, any of the transmission terminals (10aa, 10ab, . . . , 20aa, 20ab, . . . ) may be referred to as "transmission terminal 10/20", any of the displays (120aa, 120ab, . . . ) may be referred to as "display 120", and any of the relay apparatuses (30a, 30b, 30c, 30d, 30e) may be referred to as "relay apparatus 30".

A transmission terminal 10/20 sends and receives information to and from other devices. The transmission terminal 10/20 establishes a session with, for example, another terminal 10/20, and communicates with the other terminal 10/20 by sending and receiving content data including audio data and image data via the established session. With the above operation, the transmission system 1 realizes a video conference among a plurality of terminals 10/20.

In the following, "image data and audio data" may be referred to as "content data". It should be noted that the data transmitted among the terminals 10/20 are not limited to the data described in the embodiment. For example, the content data may be text data, or, may be data including text data in addition to audio data and image data. Further, the image data may include a video image or a still image. Further, the image data may include both a video image and a still image.

Further, in the transmission system 1 according to the embodiment, a user who wants to start a video conference operates a predetermined terminal 10/20 to start a video conference, and the operated terminal 10/20 transmits start request information to the management system 50.

Here, the start request information is used for requesting a start of a session for the video conference, and includes information for specifying a session destination terminal 10/20. In the following, a terminal 10/20 transmitting start request information may be referred to as a start request terminal. Further, a terminal 10/20 specified as a session destination terminal may be referred to as a destination terminal.

It should be noted that the destination terminal (session destination terminal) may be a single terminal 10/20, or two or more terminals 10/20. In other words, the transmission system 1 is capable of realizing a video conference which uses not only a session established between two terminals 10/20, but also a session established among three or more terminals 10/20.

The management system 50 manages terminals 10/20, and a relay apparatus 30 in a centralized manner. The management system 50 realizes a video conference between the terminals 10/20 by establishing a session between the terminals 10/20.

When the management system 50 receives session start request information from a predetermined terminal 10/20, the management system 50 establishes a session between the terminal 10/20 (start request terminal) which has transmitted the start request information and a destination terminal and starts the video conference.

Further, routers (70a, 70b, 70c, 70d, 70ab, 70cd) select an optimal route of content data. Further, in the present embodiment, any of the routers (70a, 70b, 70c, 70d, 70ab, 70cd) may be referred to as "router 70". The relay apparatus 30 relays content data between terminals 10/20.

The program providing system 90 includes a hard disk (HD) in which a terminal program for realizing various functions or units of the terminal 10/20 is stored, and is capable of transmitting the terminal program to the terminal 10/20. Further, the HD of the program providing system 90 also stores a relay apparatus program for realizing various functions or units of the relay apparatus 30, and the relay apparatus program can be transmitted to the relay apparatus 30. Further, the HD of the program providing system 90 also stores a transmission management program for realizing various functions or units of the management system 50, and the transmission management program can be transmitted to the management system 50.

The maintenance system 100 is a computer for maintaining or managing at least one of the terminal 10/20, the relay apparatus 30, the management system 50, and the program providing system 90. For example, in the case where the maintenance system 100 is located in a country and the terminal 10/20, the relay apparatus 30, the management system 50, or the program providing system 90 is located out of the country, the maintenance system 100 remotely maintains or manages at least one of the terminal 10/20, the relay apparatus 30, the management system 50, and the program providing system 90 via a communication network 2. Further, the maintenance system 100 performs maintenance including management of a model number, a serial number, a sale destination, a record of maintenance and inspection, a record of failure, or the like, of at least one of the terminal 10/20, the relay apparatus 30, the management system 50, and the program providing system 90, without using the communication network 2.

Further, the terminals (10aa, 10ab, 10ac, 10a . . . ), the relay apparatus 30a, and the router 70a are connected to each other and capable of communicating with each other via a LAN 2a. The terminals (10ba, 10bb, 10bc, 10b . . . , 20aa, 20ab, . . . ), the relay apparatus 30b, and the router 70b are connected to each other and capable of communicating with each other via a LAN 2b. Further, the LAN 2a and the LAN 2b are connected to each other and capable of communicating with each other by a dedicated line 2ab including the router 70ab. The LAN 2a and the LAN 2b are included in a predetermined area A. For example, the area A is Japan, LAN 2a is included in an office in Tokyo, and LAN 2b is included in an office in Osaka.

Further, the terminals (10ca, 10cb, 10cc, 10c . . . ), the relay apparatus 30c, and the router 70c are connected to each other and capable of communicating with each other via a LAN 2c. The terminals (10da, 10db, 10dc, 10d . . . ), the relay apparatus 30d, and the router 70d are connected to each other and capable of communicating with each other via a LAN 2d. Further, the LAN 2c and the LAN 2d are connected to each other and capable of communicating with each other by a dedicated line 2cd including the router 70cd. The LAN 2c and the LAN 2d are included in a predetermined area B. For example, the area B is the United States of America, LAN 2c is included in an office in New York, and LAN 2d is included in an office in Washington D.C. The area A and the area B are connected to each other and capable of communicating with each other via the Internet 2i through the respective routers (70ab, 70cd).

Further, the management system 50 and the program providing system 90 are connected to the terminal 10/20 and the relay apparatus 30 and capable of communicating with the terminal 10/20 and the relay apparatus 30 via the Internet 2i. The management system 50 and the program providing system 90 may be included in the area A or in the area B, or may be included in an area other than the areas A and B.

Further, the relay apparatus 30e is connected to the terminal 10/20 and capable of communicating with the terminal 10/20 via the Internet 2i. The relay apparatus 30e is running constantly, and is located in an area other than the areas A and B in order to avoid influence from local area communication amount of the area A or the area B. With the above arrangement, in the case where the terminal 10/20 communicates with a terminal 10/20 in another local area, the relay apparatus 30e is used for relaying content data. Further, in the case where terminals in the same local area communicate with each other and a relay apparatus in the local area is not operating, the relay apparatus 30e is used as an emergency relay apparatus.

Further, the communication network 2 according to the embodiment includes the LAN 2a, the LAN 2b, the dedicated line 2ab, the Internet 2i, the dedicated line 2cd, the LAN 2c, and the LAN 2d. The communication network 2 may include a place where not only wired communications but also wireless communications are performed.

Further, in FIG. 1, a set of four numbers under each terminal 10/20, each relay apparatus 30, the management system 50, each router 70, the program providing system 90, and the maintenance system 100 indicates a typical IP address of IPv4 in a simplified manner. For example, an IP address of the terminal 10aa is "1. 2. 1. 3". Further, IPv6 may be used instead of IPv4. But for the purpose of simplicity, IPv4 is used in the description.

<<Hardware Configuration of the Embodiment>>

Next, a hardware configuration of the embodiment will be described.

<Dedicated-to-Video-Conference Terminal>

FIG. 2 is a hardware configuration of a dedicated-to-video-conference terminal 10. As shown in FIG. 2, the terminal 10 according to the embodiment includes a central processing unit (CPU) 101 for controlling operations of the entire terminal 10, a read only memory (ROM) 102 for storing a terminal program, a random access memory (RAM) 103 used for a work area of the CPU 101, a flash memory 104 for storing various data including image data and audio data, a solid state drive (SSD) 105 for controlling writing and reading the various data to and from the flash memory 104 according to the control of the CPU 101, a media drive 107 for controlling writing and reading data to and from a recording medium 106 including a flash memory, operation buttons 108 operated for, for example, selecting a destination of the terminal 10, a power supply switch 109 for switching ON/OFF of the power supply of the terminal 10, a network interface (I/F) 111 for performing data transmission by utilizing the communication network 2 which will be described below, and an authentication accepting interface (I/F) 118.

Further, the terminal 10 includes a built-in camera 112 which captures image data by taking an image of a subject according to the control of the CPU 101, an imaging element interface 113 which controls driving the camera 112, a built-in mike 114 for inputting sound, a built-in speaker 115 for outputting sound, a sound input/output interface (I/F) 116 for processing input/output of an audio signal between the mike 114 and the speaker 115 according to the control of the CPU 101, a display interface (I/F) 117 for transmitting image data to the external display 120 according to the control of the CPU 101, an external device connection interface (I/F) 181 for connecting various external devices, an alarm lamp 119 for indicating an error of various functions of the terminal 10, and a bus line 110 such as an address bus, a data bus, etc., for electrically connecting the above elements.

Further, the terminal 10 may include an NFC I/F 121 or a Bluetooth I/F 122. The NFC I/F 121 is a communication interface corresponding to near field communication (NFC) which is one of international standards (ISO/IEC 18092, etc.,) for the data communications in the near field. The Bluetooth I/F 122 is a communication interface corresponding to Bluetooth (IEEE 802.15.1, etc.,) which is standardized as one of short-range wireless communication technologies.

The display 120 is a display unit which includes a liquid crystal display or an organic electroluminescence (EL) display used for displaying an image of a subject, an operation icon, or the like. Further, the display 120 is connected to the display I/F 117 via the cable 120c. The cable 12c may be a cable for an analog RGB (VGA) signal, a cable for a component video signal, or a cable for a signal of High-Definition Multimedia Interface (HDMI) (registered trademark) or Digital Video Interactive (DVI).

The camera 112 includes a lens and a solid-state image sensing device which is used for converting light into electricity and computerizing the subject image, and as the solid-state image sensing device, complementary metal oxide semiconductor (CMOS), charge coupled device (CCD), etc., are used.

External devices such as an external camera, an external mike, an external speaker, etc., can be electrically connected to the external device connection I/F 181 by using a universal serial bus (USB) cable, etc. In the case where the external camera is connected, according to the control of the CPU 101, driving priority is given to the external camera over the built-in camera 112. Similarly, in the case where an external mike is connected or an external speaker is connected, according to the control of the CPU 101, driving priority is given to the external mike or the external speaker over the built-in mike 114 or the built-in speaker 115, respectively.

It should be noted that the recording medium 106 is detachable from the terminal 10. Further, it is not limited to the flash memory 104 that is used, and, electrically erasable and programmable ROM (EEPROM), or the like may be used as long as it is a non-volatile memory to/from which data is written/read according to the control of the CPU 101.

Further, the terminal program may be recorded in a computer-readable recording medium (the recording medium 106, etc.,) as a file of installable format or executable format, and may be distributed. Further, the terminal program may be stored not in the flash memory 104 but in the ROM 102.

<General-Purpose Terminal>

FIG. 3 is a hardware configuration diagram of a general-purpose terminal 20. As shown in FIG. 3, the terminal 20 according to the present embodiment includes a CPU 201 for controlling operations of the entire terminal 20, an input apparatus 202 for inputting various operation signals to the terminal 20, a display apparatus 203 for displaying results of processes by the terminal 20, an external interface (I/F) 204 as an interface to various kinds of external apparatuses such as an external mike, an external camera, an external recording medium, etc., a RAM 205 used as a work area of the CPU 201, a ROM 206 used for storing a program and data including OS settings and network settings of the terminal 20, a network I/F 207 used for transmitting data by using a mobile telephone communication network or the Internet, a flash memory 208 for storing various data including the terminal program, etc., and an SSD 209 for controlling writing and reading the various data to and from the flash memory 208 according to the control of the CPU 201.

Further, the terminal 20 includes a built-in camera 210 which captures image data by taking an image of a subject according to the control of the CPU 201, an imaging element I/F 211 which controls driving the camera 210, a built-in mike 212 for inputting sound, a built-in speaker 213 for outputting sound, a sound input/output I/F 214 for processing input/output of an audio signal between the mike 212 and the speaker 213 according to the control of the CPU 201, and a bus line 215 such as an address bus, a data bus, etc., for electrically connecting the above elements. It should be noted that, in the case where the terminal 20 uses only text chat services, the camera 210, the mike 212, the speaker 213, etc., may not be included.

Further, the terminal 20 may include any one of a NFC I/F 221 and a Bluetooth (registered trade mark) I/F 222, or both.

Further, it is not limited to using the flash memory 208, and, an EEPROM, or the like may be used as long as it is a non-volatile memory to/from which data is written/read according to the control of the CPU 101.

Further, the terminal program may be recorded in a computer-readable recording medium as a file of installable format or executable format, and may be distributed.

Further, the terminal program may be stored not in the flash memory 208 but in the ROM 206.

<Management System>

FIG. 4 is a hardware configuration diagram of a management system 50 according to an embodiment. The management system 50 includes a CPU 501 for controlling overall operations of the management system 50, a ROM 502 used for storing a transmission management program, a RAM 503 used for a work area of the CPU 501, a HD 504 for storing various data, a HDD 505 for controlling various data read and write of the HD 504 according to the control of the CPU 501, a medium drive 507 for controlling data read and write (storage) of a recording medium 506 including a flash memory, a display 508 for displaying information including a cursor, a menu, a window, a character, or an image, a network I/F 509 for performing data communications by using the communication network 2, a keyboard 511 including a plurality of keys for inputting a character, a numerical value, various instructions, etc., a mouse 512 for selecting and executing the various instructions, selecting a process target, moving the cursor, or the like, a CD-ROM drive 514 for controlling various data read and write of a CD-ROM 513 as an example of a detachable recording medium, and a bus line 510 such as an address bus, a data bus, etc., for electrically connecting the above elements.

It should be noted that the transmission management program may be recorded in a computer-readable recording medium including the recording medium 506 and the CD-ROM 513 as a file of installable format or executable format, and may be distributed.

Further, because the relay apparatus 30 includes a similar hardware configuration as the management system 50, the descriptions may be omitted. In the case of the relay apparatus 30, however, a relay apparatus program for controlling the relay apparatus 30 is included in the ROM 502. Also, in this case, the relay apparatus program may be recorded in a computer-readable recording medium including the recording medium 506 and the CD-ROM 213 as a file of installable format or executable format, and may be distributed.

Further, because the program providing system 90 includes a similar hardware configuration as the management system 50, the descriptions may be omitted. In the case of the program providing system 90, however, a program providing program for controlling the program providing system 90 is included in the ROM 502. Also, in this case, the program providing program may be recorded in a computer-readable recording medium including the recording medium 506 and the CD-ROM 213 as a file of installable format or executable format, and may be distributed.

Further, because the maintenance system 100 includes a similar hardware configuration as the management system 50, the descriptions may be omitted. In the case of the maintenance system 100, however, a maintenance program for controlling the maintenance system 100 is included in the ROM 502. Also, in this case, the maintenance program may be recorded in a computer-readable recording medium including the recording medium 506 and the CD-ROM 213 as a file of installable format or executable format, and may be distributed.

It should be noted that, as another example of a detachable recording medium, computer-readable recording media including a compact disc recordable (CD-R), a digital versatile disk (DVD), a Blu-ray disc, etc., may be used.

<<Functional Configuration of Embodiment>>

Next, a functional configuration of the present embodiment will be described. FIG. 5 is a functional block diagram of a terminal, an apparatus, and a system included in a transmission system 1 according to the present embodiment. In FIG. 5, the terminal 10/20, the relay apparatus 30, and the management 50 are connected to perform data communications via the communication network 2. Further, the program providing system 90 and the maintenance system 100 shown in FIG. 1 are omitted in FIG. 5 because they are not directly related to video conference communications.

<Functional Configuration of Terminal>

The terminal 10/20 includes a communication unit 11, an operation input accepting unit 12, a login request unit 13, an imaging unit 14, an audio input unit 15a, an audio output unit 15b, a display control unit 16, a delay detection unit 18, a storing and reading processing unit 19, a destination list generation unit 1-20, a user authentication accepting unit 1-21, and a dedicated-purpose-terminal-and-general-purpose-terminal cooperation unit 1-22. The above units are functions or means which are realized by any of the elements shown in FIG. 2 or FIG. 3 which operates according to instructions from the CPU 101 or 201 which executes programs stored in the ROM 102 or 206. Further, the terminal 10/20 includes a volatile storage unit 1002 including the RAM 103 or 205, and a non-volatile storage unit 1000 including the flash memory 104 or 208.

(Function Units of Terminal)

Next, units of the terminal 10/20 will be described in detail. The communication unit 11 of the terminal 10/20 is realized by the network I/F 111 or 207, and performs sending and receiving data (or information) to and from other terminals, apparatuses, or systems via the communication network 2.

The communication unit 11 starts receiving state information indicating states of terminals 10/20 as destination terminal candidates from the management system 50 before the terminal 10/20 establishes a session with another terminal 10/20 and starts a video conference.

Here, a destination terminal candidate is a terminal the terminal 10/20 may specify as a session destination, with which the terminal 10/20 performs a video conference. In other words, the terminal 10/20 cannot establish a session or perform a video conference with a terminal that is not preset as a destination terminal candidate. It should be noted that the destination terminal candidate is a candidate of a destination terminal with which the terminal 10/20 performs a video conference.

It should be noted that the state information indicates an operational state of terminals 10/20 (ONLINE state or OFFLINE state), and a detailed state of ONLINE such as "COMMUNICATING", "WAITING FOR COMMUNICATION", etc., (hereinafter, referred to as a communication state). Further, the state information indicates, not only an operational state and a communication state of the terminal 10/20, but also various other states such as a cable being disconnected from the terminal 10/20, audio not being output while an image is being output, an audio output being blocked (MUTE), etc. In the following, a case is described as an example in which the state information indicates an operational state and a communication state.

In the case where the terminal 10/20 operates as a start request terminal, the communication unit 11 transmits start request information to the management system 50. Here, the start request information is for requesting a start of a session used for a video conference. Specifically, the start request information includes information indicating a start request, a terminal ID of the start request terminal as a transmission source of the start request information, and a terminal ID which identifies a destination terminal of the session. It should be noted that a terminal ID is information for identifying a terminal 10/20.

The user authentication accepting unit 1-21 accepts user authentication information input via the authentication accepting I/F 118.

The operation input accepting unit 12 is realized by the operation button 108 and the power supply switch 109, and accepts various inputs from a user. For example, when the user turns ON the power supply switch 109, the operation input accepting unit 12 accepts an input of power supply ON, and turns ON the power supply.

The login request unit 13 is realized by instructions from the CPU 101, and, triggered by the accepted input of the power supply ON, automatically transmits login request information indicating a login request and a current IP address of the terminal 10 to the management system 50 by using the communication unit 11 via the communication network 2. Further, when the user turns the power supply switch 109 from an ON state to an OFF state, the operation input accepting unit 12 turns OFF the power supply after the communication unit 11 transmits state information indicating a power supply OFF state. With the above operation, the management system 50 recognizes that a power supply state of the terminal 10 is changed from the power supply ON state to the power supply OFF state.

The imaging unit 14 is realized by instructions from the CPU 101 or 201, the camera 112 or 210, and the imaging element I/F 113 or 211; takes an image of a subject; and outputs the taken image data. The audio input unit 15a is realized by the audio input/output I/F 116 or 214. After a voice of a user is converted to an audio signal by the mike 114 or 212, audio data of the converted audio signal is input to the audio input/output I/F 116 or 214. The audio output unit 15b is realized by instructions from the CPU 101 or 201 and the audio input/output I/F 116 or 214. The audio output unit 15b outputs the audio signal of the audio data to the speaker 115 or 213, and the voice is output from the speaker 115 or 213.

The display control unit 16 is realized by the display I/F 117, etc., and controls transmission of image data to the external display 120 or the display apparatus 203. The display control unit 16 displays on the display 120 or the display apparatus 203 a destination list including destination names reflecting state information received after the start of reception by the communication unit 11 before the start of a video conference between the terminal 10/20 as a request source and a terminal 10/20 as a desired destination.

The delay detection unit 18 is realized by instructions from the CPU 101 or 201, and detects delay time (ms) of the image data or the audio data transmitted from another terminal 10/20 via the relay apparatus 30.

Further, the storing and reading processing unit 19 is realized by instructions from the CPU 101 or 201 and, as an example, the SSD 105 or 209, and performs a process of storing various data in the non-volatile storage unit 1000 and reading the various data stored in the non-volatile storage unit 1000. The non-volatile storage unit 1000 stores a terminal identification (ID) for identifying a terminal 10/20, a password, and the like. Further, the storing and reading processing unit 19 performs a process of storing various data in the volatile storage unit 1002 and reading the various data stored in the volatile storage unit 1002. When communicating with a destination terminal 10/20, received content data are stored and overwritten in the volatile storage unit 1002 every time the content data are received. An image is displayed on the display 120 or the display apparatus 203 based on the image data prior to the overwrite, and audio is output from the speaker 115 or 213 based on the audio data prior to the overwrite.

The destination list generation unit 1-20 generates and updates a destination list in which a state of destination candidate is indicated by an icon based on destination list information (described below) and state information (described below) of the terminal 10 as a destination candidate received from the management system 50.

Especially, in the present embodiment, in the case where a user of the terminal 10/20 inputs authentication information to the authentication accepting I/F 118 and a destination list based on the user is received from the management system 50 in a state where the terminal 10/20 is logged in to the management 50 and a destination list based on the terminal 10/20 is being displayed on the display 120, the destination list generation unit 1-20 generates a destination list based on the user from the destination list information based on the user. As a result, the display control unit 16 updates the destination list based on the terminal 10/20 displayed on the display 120 with the newly generated destination list based on the user.

Further, in the case where a second user of the terminal 10/20 inputs authentication information to the authentication accepting I/F 118 and a destination list based on the second user is received from the management system 50 in a state where a first user is logged in to the management 50 and a destination list based on the first user is being displayed on the display 120, the destination list generation unit 1-20 generates a destination list based on the second user from the destination list information based on the second user. As a result, the display control unit 16 updates the destination list based on the first user displayed on the display 120 with the newly generated destination list based on the second user.

The dedicated-purpose-terminal-and-general-purpose-terminal cooperation unit 1-22 controls cooperative processing between a terminal 10 as a dedicated-purpose terminal and a terminal 20 as a general-purpose terminal 20. More specifically, the dedicated-purpose-terminal-and-general-purpose-terminal cooperation unit 1-22 associates in advance the terminal 20 with one of the terminals 10 according to a user's operation (pairing), and in the case where a call has arrived at the terminal 20, causes a video conference to be started by the terminal 10 according to an instruction from the terminal 20. Further, when a call is made from the terminal 20 according to the destination list (address book), the dedicated-purpose-terminal-and-general-purpose-terminal cooperation unit 1-22 associates the terminal 20 with one of the terminals 10 according to the user's operation (pairing), and causes the terminal 10 to make a call to the destination and start a video conference.

It is possible to provide a video conference by making/receiving a call by using a general-purpose terminal as well as by using a dedicated-purpose terminal. However, there is a strong desire for providing a video conference by using a dedicated-purpose terminal because the dedicated-purpose terminal is advantageous in performance of a camera, a display, a speaker, etc. In the case where the dedicated-purpose terminal is used with a personal account, there is a risk in that a user's destination list may be seen by another user, or an illegal operation may be performed by using the personal account of the user when the user is away from the desk. However, according to the above cooperation between the dedicated-purpose terminal and the general-purpose terminal, a safe video conference using a personal account can be provided even when a dedicated-purpose terminal is used.

<Functional Configuration of Relay Apparatus>

Next, functions or means of a relay apparatus 30 will be described. The relay apparatus 30 includes a communication unit 31, a state detection unit 32, a data quality checking unit 33, a change quality management unit 34, a data quality change unit 35, and a storing and reading processing unit 39. The above units are functions or means which are realized by any of the elements shown in FIG. 4 which operates according to instructions from the CPU 501 which executes programs stored in the ROM 502. Further, the relay apparatus 30 includes a non-volatile storage unit 3000 including an HD 504 in which stored data and information are maintained even when the power supply of the relay apparatus 30 is turned OFF.

The non-volatile storage unit 3000 includes a change quality management database (DB) 3001 including a change quality management table. It should be noted that in the change quality control table, an IP address of the terminal 10 as a relay destination of image data is associated with image quality of the image data which are relayed to the relay destination by the relay apparatus 30.

(Functional Units of Relay Apparatus)

Next, a functional configuration of the relay apparatus 30 will be described in detail. It should be noted that when the functional units of the relay apparatus 30 are described, relations between the functional units and main elements used for realizing the functional units of the relay apparatus 30 will be also described.

The communication unit 31 of the relay apparatus 30 is realized by the network I/F 509, and performs sending and receiving data (or information) to and from other terminals, apparatuses, or systems via the communication network 2. The state detection unit 32 is realized by instructions from the CPU 501, and detects an operational state of the relay apparatus 30 which includes the state detection unit 32. As an operational state, there is a state such as "ONLINE", "OFFLINE", or "OUT OF ORDER".

The data quality checking unit 33 is realized by instructions from the CPU 501, and, checks image quality of the relayed image data by using an IP address of the destination terminal as a search key, searches the change quality management table, extracts image quality of the corresponding relayed image data, and determines the image quality of the image data which the relay apparatus relays. The change quality management unit 34 is realized by instructions from the CPU 501, and changes contents of the change quality management table of the change quality management database (DB) 3001 based on quality information received the management system 50.

The data quality change unit 35 is realized by instructions from the CPU 501, and changes image quality of the image data transmitted from the transmission source terminal 10/20 based on the changed change quality management table of the change quality management database (DB) 3001. The storing and reading processing unit 39 is realized by the HDD 505, and performs a process of storing various data in the non-volatile storage unit 3000 and reading the various data stored in the non-volatile storage unit 3000.

<Functional Configuration of Management System>

Next, functions or means of a management system 50 will be described. The management system 50 includes a communication unit 51, an authentication unit 52, a state management unit 53, a terminal extracting unit 54, a terminal state obtaining unit 55, a session management unit 57, quality determination unit 58, a storing and reading processing unit 59, a delay time management unit 60 and a destination determination unit 62. The above units are functions or means which are realized by any of the elements shown in FIG. 4 which operates according to instructions from the CPU 501 which executes programs stored in the ROM 502. Further, the management system 50 includes a non-volatile storage unit 5000 including the HD 504 in which stored data and information are maintained even when the power supply of the management system 50 is turned OFF. Information is stored in the non-volatile storage unit 5000. Further, the management system 50 includes a volatile memory unit 5100 including the RAM 503.

(Relay Apparatus Management Table)

The non-volatile storage unit 5000 includes a relay apparatus management database (DB) 5001 including a relay apparatus management table. In the relay apparatus management table, each relay apparatus ID used for identifying the relay apparatus 30 is associated with an operational state of the relay apparatus 30, receive date and time when state information indicating the operational state is received by the management system 50, an IP address of the relay apparatus 30, and a maximum data transmission rate (Mbps) of the relay apparatus 30.

(Authentication Management Table)

Further, the non-volatile storage unit 5000 includes an authentication management database (DB) 5002 including an authentication management table as shown in FIG. 6. In the authentication management table, for the terminal IDs of the terminals 10/20 controlled by the management system 50, each of the user IDs of users who use the respective terminals 10/20 is associated with a password. Here, a terminal ID is information for identifying a terminal 10/20, and a user ID is information for identifying a user. A password is information used for authenticating a terminal 10/20 or a user. Here, a terminal ID and a user ID are collectively referred to as an ID. For example, it is illustrated in the authentication management table shown in FIG. 6, that a password for a terminal or a user whose ID is "10aa" is "aaaa".

It should be noted that the ID used in the present embodiment refers to identification information including languages, characters, symbols, or various kinds of signs used for uniquely identifying a terminal 10/20 or a user. Further, the ID may be identification information including a combination of at least two of the languages, characters, symbols, and various signs. Further, the terminal ID may include identification information for identifying a user.

(Terminal Management Table)

Further, the non-volatile storage unit 5000 includes a terminal management database (DB) 5003 including a terminal management table as shown in FIG. 7. In the terminal management table, each of terminal IDs of the terminals 10/20 is associated with a terminal name, an operational state of the terminal 10/20, receive date and time when login request information (described below) is received by the management system 50, and an IP address of the terminal 10/20.

Here, the operational state includes "ONLINE" where the power supply is ON and communications are available or communications are being provided, and "OFFLINE" where communications are not available including a state where the power supply is OFF. For example, it is illustrated in the terminal management table shown in FIG. 7, that regarding the terminal 10aa whose terminal ID is "10aa", a terminal name is "JAPAN TOKYO OFFICE TERMINAL AA", an operational state is "ONLINE (COMMUNICATION AVAILABLE)", date and time when a login request information is received by the management system 50 is "NOVEMBER 10, 2009, 13:40", and an IP address of the terminal 10aa is "1.2.1.3".

(Destination List Management Table)

Further, the non-volatile storage unit 5000 includes a destination list management database (DB) 5004 including a destination list management table as shown in FIG. 8. In the destination list management table, a terminal ID of a start request terminal 10/20 as a request source of session start request information used for a video conference controlled by the management system 50 is associated with terminal IDs identifying destination terminal candidates 10/20 as destination candidates of content data transmitted from the terminal 10/20 as a request source and corresponding IDs including user IDs of users using the terminals 10/20 as destination candidates. For example, it is illustrated in the destination list management table shown in FIG. 8, that destination terminal candidates to which the terminal whose terminal ID is "10aa" (terminal 10aa) can transmit a video conference start request are a terminal 10ab whose terminal ID is "10ab", a terminal 10ac whose terminal ID is "10ac", a terminal 10ad whose terminal ID is "10ad", and a terminal 10ae whose terminal ID is "10ae". The destination terminal candidates are updated (added or deleted) according to an add request or a delete request from the start request terminal to the management system 50.

(Session Management Table)

Further, the non-volatile storage unit 5000 includes a session management database (DB) 5005 including a session management table. In the session management table, each session ID used for identifying a session in which content data are transmitted between terminals is associated with a relay apparatus ID of a relay apparatus 30 used for relaying the content data in the session, a terminal ID of the start request terminal as a transmission source of session start request information, a terminal ID of the destination terminal specified as a destination in the session start request information, a receive delay time when image data are received by the destination terminal, and receive date and time when delay information indicating the delay time sent from the destination terminal is received by the management system 50.

(Quality Management Table)

Further, the non-volatile storage unit 5000 includes a quality management database (DB) 5007 including a quality management table. In the quality management table, the delay time (ms) of the image data at the start request terminal or at the destination terminal is associated with image quality (quality of image) of the image data relayed by the relay apparatus 30.

(Functional Units of Management System)

Next, functional units of the management system 50 will be described in detail. It should be noted that, in the following, when functional units of the management system 50 are described, relations between functional units and main elements of the elements shown in FIG. 4, which are used for realizing the functional units of the management system 50, will be also described.

The communication unit 51 is realized by the network I/F 509, and performs sending and receiving data (or information) to and from other terminals, apparatuses, or systems via the communication network 2. The authentication unit 52 performs authentication of the terminal 10/20 or the user by searching the authentication management table of the non-volatile storage unit 5000 by using a set of a terminal ID/user ID and a password included in login request information received via the communication unit 51 as a search key, and determining whether the same set of the ID and the password is included in the authentication management table.

The state management unit 53 controls operational states of the terminal management table. In order to control an operational state of a terminal requesting login (login request terminal), the state management unit 53 associates a terminal ID of the login request terminal with an operational state of the login request terminal, receive date and time when the login request information is received by the management system 50, and an IP address of the login request terminal, and stores them in the terminal management table. The state management unit 53 changes the operational state of the terminal 10/20 in the terminal management table from "OFFLINE" to "ONLINE" based on information indicating power supply ON transmitted from the terminal 10/20 when a user of the terminal 10/20 changes the power supply switch 109 of the terminal 10/20 from an OFF state to an ON state. Further, the state management unit 53 changes the operational state of the terminal 10/20 in the terminal management table from "ONLINE" to "OFFLINE" based on information indicating power supply OFF transmitted from the terminal 10/20 when the user of the terminal 10/20 changes the power supply switch 109 of the terminal 10/20 from an ON state to an OFF state.

The state management unit 53 changes the operational state of at least one of the start request terminal and the destination terminal in the terminal management table based on change request information from the start request terminal of the video conference start request information or the destination terminal, which information is received by the communication unit 51.

The terminal extracting unit 54 reads and extracts a terminal ID of a destination terminal candidate with which a target terminal can communicate, or between which candidate and the target terminal a session can be established, by searching the destination list management table by using as a search key, a terminal ID of the terminal 10/20 as the target terminal that has requested login or a user ID of the user of the terminal 10/20, collectively referred to as ID. Specifically, the terminal extracting unit 54 reads a terminal ID of a destination terminal candidate which is associated with the ID of the target terminal, or the start requesting terminal, in the destination list management table.

Further, the terminal extracting unit 54 searches the destination list management table by using the ID of a target terminal, and extracts another terminal 10/20 that registers the ID of the target terminal as one of destination terminal candidates of the other terminal 10/20. Specifically, the terminal extracting unit 54 reads a terminal ID of another start request terminal which is associated with the terminal ID of the destination terminal candidate which matches with the ID of the target terminal.

The terminal state obtaining unit 55 searches the terminal management table by using an ID as a search key and reads a corresponding operational state of the ID. With the above operation, the terminal state obtaining unit 55 can obtain operational states of destination terminal candidates which are capable of communicating with the terminal 10/20 that has requested login. Further, the terminal state obtaining unit 55 obtains an operational state of the terminal that has requested login.

The session management unit 57 associates a session ID generated by the session ID generating unit with a terminal ID of the request source terminal and a terminal ID of the destination terminal, and stores them in the session management table of the non-volatile storage unit 5000. Further, the session management unit 57 stores relay apparatus IDs of corresponding relay apparatuses 30 that are selected for the session IDs in the session management table.

The quality determination unit 58 determines image quality of image data that are relayed by the relay apparatus 30 by searching the quality management table by using the above delay time as a search key, and extracting corresponding image quality of image data. The storing and reading processing unit 59 is realized by the HDD 505, and performs a process of storing various data in the non-volatile storage unit 5000 and reading the various data stored in the non-volatile storage unit 5000. Further, the storing and reading processing unit 59 also performs a process of storing various data in the volatile storage unit 5100 and reading the various data stored in the volatile storage unit 5100.

The delay time management unit 60 searches the terminal management table by using an IP address of the destination terminal as a search key, extracts a corresponding terminal ID, and further, stores the delay time indicated by the delay information in a delay time field of a record in the session management table, in which record the extracted terminal ID is included.

The destination determination unit 62 determines whether a destination terminal ID of the terminal 10/20 whose participation is requested is included in the destination terminal IDs of the terminals 10/20 that are participating in a content data session "sed" extracted by the terminal extracting unit 54, by referring to the destination list management table.

<<Operation>>

<Start Up of Terminal>

FIG. 9 is a sequence diagram illustrating a process example when a terminal starts up. The process is mainly aimed at a start up process of a shared dedicated-purpose client terminal.

In FIG. 9, when a user turns ON a power supply button to start up the terminal 01ab (step S001), the terminal 01ab performs a start up process (step S002).

Next, the terminal 01ab transmits to the transmission management system 50 an authentication request based on a predefined shared account (step S003). The transmission management system 50 performs terminal authentication (step S004) and responds with an authentication result to the terminal 01ab (step S005).

Next, in the case where the authentication is successful, the terminal 01ab transmits to the transmission management system 50 a destination list request (step S006) and the transmission management system 50 transmits a destination list to the terminal 01ab (step S007). With the above operation, the terminal 01ab displays the destination list on its screen (step S008). Further, the transmission management system 50 transmits a state of the terminal 01ab to another terminal 01ba (step S009).

Afterward, when the user performs a login operation by providing the terminal 01ab with user identification information of the user's personal account (step S010), the terminal 01*ab* transmits to the transmission management system 50 a user authentication request (step S011). It should be noted that, depending on a system implementation, a user may be allowed to use the system not only by performing a login operation by providing user identification information, but also by without performing a login procedure by providing effective user identification information.

Upon receiving the user's request, the transmission management system 50 performs the user authentication (step S012), and responds with an authentication result to the terminal 01*ab* (step S013). Further, the transmission management system 50 transmits a state of the user to the other terminal 01*ba* (step S014).

On the other hand, a general-purpose personal client terminal performs a process of steps S010 through S014 skipping steps S001 through S009.

It should be noted that, in the following process description, a start up process of a terminal will be briefly described but the detailed description is as shown in FIG. 9.

<Making a Call>

The following illustrates a case in which a user, who is using a personal client terminal by using a personal account, wants to perform an operation for selecting a destination from a personal destination list (address book) on the personal client terminal and making a call, and then, has a video conference with the destination by making a call from a shared client terminal.

(In the Case where Two-Dimensional Code is Used)

FIG. 10 and FIG. 11 are sequence diagrams illustrating a process example of an embodiment in which a two-dimensional code such as a QR code (registered trademark) is used for cooperation between a personal client terminal and a shared client terminal.

In FIG. 10, first, a user starts up a personal client terminal and a shared client terminal (step S101, S105). The user logs on to the personal client terminal and the shared client terminal by using respective accounts (step S102, S106). Respective destination lists are displayed (step S103, S107).

Here, the shared client terminal displays a two-dimensional code including self-identifying information in addition to the destination list (step S103). FIG. 12 illustrates a state in which the destination list I1 and the two-dimensional code I2 are displayed on the screen of the shared client terminal.

FIG. 13 illustrates an example of data embedded in the two-dimensional code in which an address of the shared client terminal, a random token, and optionally a public key are included. In a process example of FIG. 10, the public key is omitted.

The address is used as a destination when the personal client terminal transmits a message to the shared client terminal.

The random token is used for preventing the user from storing and reusing the two-dimensional code displayed on the shared client terminal. When the personal client terminal transmits a message to the shared client terminal, the personal client terminal transmits the random token as well. The shared client terminal verifies whether the random token matches the latest random token, and thus, the reuse of the two-dimensional code can be prevented.

The public key is used for encrypting the message which is transmitted from the personal client terminal to the shared client terminal. The message transmitted from the personal client terminal to the shared client terminal includes important information used for approval of service use by a personal account. Therefore, the encryption by the public key is used for preventing the content of the message from being read by a terminal other than the shared client terminal.

Referring to FIG. 10, the shared client terminal periodically updates the random token (step S104), which is for preventing the two-dimensional code from being stored and reused.

The user operates the personal client terminal to select a call destination from the destination list (step S108). When the user taps on an icon of the shared client terminal (step S110) in the displayed making call confirmation screen (step S109), the personal client terminal starts a two-dimensional code reader (step S111).

FIG. 14 illustrates an operation example of the personal client terminal; (a) illustrates a state in which "Mr. A" is selected from the destination list; (b) illustrates a state in which "shared client terminal conference start" is selected for the destination "Mr. A" from "normal conference start", "shared client terminal conference start" (shared client terminal's icon), and "cancel"; and (c) illustrates a state in which the two-dimensional code reader is started.

Returning to FIG. 10, the user uses the two-dimensional code reader to read the two-dimensional code displayed on the screen of the shared client terminal (step S112), and the personal client terminal obtains an address of the shared client terminal and a random token from the two-dimensional code (step S113).

With the above operation, the personal client terminal displays a relay process start notification for the user (step S114), and transmits to the address of the shared client terminal via the transmission management system 50 approval information (login information, etc.,) for using a video conference service by using a personal account, a call destination selected by the user, and a random token, as a making call relay request (step S115). At this point, the personal client terminal displays a making call relay screen as shown in FIG. 14(*d*).

Returning to FIG. 10, upon receiving a making call relay request from the personal client terminal via the transmission management system 50 (step S116), the shared client terminal determines whether the random token included in the message is the same as the random token that is displayed by itself now (step S117).

Next, referring to FIG. 11, the shared client terminal transmits to the personal client terminal via the transmission management system 50 an approval message if the random tokens are the same or a disapproval message if the random tokens are not the same (step S118, S119).

The personal client terminal receives the message from the shared client terminal, and displays on the screen whether the making call relay request is approved or disapproved (step S120). In the case of approval, the personal client terminal logs out from the personal account upon displaying on the screen (step S121). FIG. 14(*e*) illustrates an example of a making call relay result screen.

Returning to FIG. 11, in the case of approval, the shared client terminal logs in with the personal account by using the approval information used for receiving the video conference service by the personal account included in the making call relay request (step S122).

Next, when the shared client terminal successfully logs in with the personal account, the shared client terminal makes a call for the user selected destination included in the making call relay request (step S123). Upon receiving the call by using the personal account from the shared client terminal, the transmission management system 50 makes a call for the destination client terminal (step S124). After receiving a response from the destination client terminal (step S125), the transmission management system 50 transmits the response to the shared client terminal (step S126). The destination client terminal transmits a conference start request to the relay apparatus 30 (step S127).

Upon receiving the response indicating a successful call, the shared client terminal transmits a conference start request to the relay apparatus 30 (step S128), transitions to a conference screen, and starts a video conference with the destination client terminal.

When the conference is ended because of a certain reason, the relay apparatus 30 transmits an end of conference to the shared client terminal (step S129), the shared client terminal logs out from the personal account (step S130), and the end-of-conference notification is displayed for the user (step S131).

When the user acknowledges the end-of-conference notification (press OK) (step S132), the shared client terminal logs in with the shared account (step S133) and displays the destination list for the shared account.

(In the Case where Token Strings are Manually Input)

FIG. 15 and FIG. 16 are sequence diagrams illustrating another process example of an embodiment in which cooperation between a personal client terminal and a shared client terminal is performed by using manually input token strings.

In FIG. 15, first, a user starts up the personal client terminal and the shared client terminal (step S201, S204). The user logs on to the personal client terminal and the shared client terminal by using respective accounts (step S202, S205), and respective destination lists are displayed (step S203, S206).

Here, the shared client terminal displays, in addition to the destination list, token strings including information for identifying the shared client terminal (step S203). It should be noted that the token strings are regenerated and the display of the token strings is updated at regular time intervals. The token strings are displayed in place of, or together with, the two-dimensional code I2 in FIG. 12. The token strings are strings in which information illustrated in FIG. 13 is encoded.

Returning to FIG. 15, the user operates the personal client terminal to select a call destination from the destination list (step S207). When the user taps on an icon of the shared client terminal (step S209) in response to the making call confirmation screen display (step S208), the personal client terminal displays a token input screen (step S210).

FIG. 17 illustrates an operation example of the personal client terminal; (a) illustrates a state in which "Mr. A" is selected from the destination list; (b) illustrates a state in which "shared client terminal conference start" is selected for the destination "Mr. A" from "normal conference start", "shared client terminal conference start" (shared client terminal's icon), and "cancel"; and (c) illustrates a state in which the token input screen is displayed.

Returning to FIG. 15, referring to the token strings displayed on the shared client terminal (step S211, S212), the user inputs the token strings in the token input screen (step S213). The personal client terminal decodes the token strings and obtains the address and the random token of the shared client terminal (step S214).

With the above operation, the personal client terminal transmits to the address of the shared client terminal via the transmission management system 50, as a making call relay request, approval information (login information, etc.,) for using a video conference service by using a personal account, a call destination selected by the user, and a random token (step S115). At this point, the personal client terminal displays a making call relay screen as shown in FIG. 17(d).

Returning to FIG. 15, upon receiving a making call relay request from the personal client terminal via the transmission management system 50 (step S216), the shared client terminal determines whether the random token included in the message is the same as the random token that is being displayed by itself now (step S217).

Next, referring to FIG. 16, the shared client terminal transmits to the personal client terminal via the transmission management system 50 an approval message if the random tokens are the same, or a disapproval message if the random tokens are not the same (step S218, S219).

The personal client terminal receives the message from the shared client terminal, and displays on the screen whether the making call relay request is approved or disapproved (step S220). In the case of approval, the personal client terminal logs out from the personal account upon displaying on the screen (step S221). FIG. 17(e) illustrates an example of a making call relay result screen.

Returning to FIG. 16, in the case of approval, the shared client terminal logs in with the personal account by using the approval information used for receiving the video conference service by the personal account included in the making call relay request (step S222).

Next, when the shared client terminal successfully logs in with the personal account, the shared client terminal makes a call for the destination selected by the user included in the making call relay request (step S223). Upon receiving the call by the personal account from the shared client terminal, the transmission management system 50 makes a call for the destination client terminal (step S224). After receiving a response from the destination client terminal (step S225), the transmission management system 50 transmits the response to the shared client terminal (step S226). The destination client terminal transmits a conference start request to the relay apparatus 30 (step S227).

Upon receiving the response indicating a successful call, the shared client terminal transmits a conference start request to the relay apparatus 30 (step S228), transitions to a conference screen, and starts a video conference with the destination client terminal.

When the conference is ended because of a certain reason, the relay apparatus 30 transmits an end of conference to the shared client terminal (step S229), the shared client terminal logs out from the personal account (step S230), and the end-of-conference notification is displayed for the user (step S231).

When the user acknowledges the end-of-conference notification (press OK) (step S232), the shared client terminal logs in with the shared account (step S233) and displays the destination list for the shared account.

(In the Case where Direct Communication Between Terminals (NFC) is Used)

FIG. 18 and FIG. 19 are sequence diagrams illustrating another process example of an embodiment in which cooperation between a personal client terminal and a shared client terminal is performed by using direct communication between terminals (NFC).

In FIG. 18, first, a user starts up the personal client terminal and the shared client terminal (step S301, S305). The user logs on to the personal client terminal and the shared client terminal by using respective accounts (step S302, S306), and respective destination lists are displayed (step S303, S307).

The shared client terminal goes into a state waiting for an NFC direct communication (step S304). It should be noted that the terminals can recognize each other by physical proximity in the case of direct communication, and thus, it is not necessary to separately provide the address and the random token.

Next, the user operates the personal client terminal to select a call destination from the destination list (step S308). When the user taps on an icon of the shared client terminal (step S310) in response to the making call confirmation screen display (step S309), the personal client terminal displays a screen prompting an NFC operation (proximity to the shared client terminal)(step S311).

FIG. 20 illustrates an operation example of the personal client terminal; (a) illustrates a state in which "Mr. A" is selected from the destination list; (b) illustrates a state in which "shared client terminal conference start" is selected for the destination "Mr. A" from "normal conference start", "shared client terminal conference start" (shared client terminal's icon), and "cancel"; and (c) illustrates a state in which the screen prompting an NFC operation is displayed.

Returning to FIG. 18, when the user causes the personal client terminal to touch the shared client terminal for NFC communication, the personal client terminal transmits to the shared client terminal via the NFC communication, as a making call relay request, approval information (login information, etc.,) for using a video conference service by using a personal account and a call destination selected by the user (step S312).

Further, the personal client terminal detects the NFC touch (step S313), and displays a relay process start notification for the user (step S314). At this point, the personal client terminal displays a making call relay screen as shown in FIG. 20(d).

Returning to FIG. 18, upon receiving a making call relay request from the personal client terminal, the shared client terminal transmits a response via the NFC communication indicating whether the making call relay request is approved or disapproved (step S315).

Referring to FIG. 19, the personal client terminal receives the response from the shared client terminal, and displays on the screen whether the making call relay request is approved or disapproved (step S316). In the case of approval, the personal client terminal logs out from the personal account upon displaying on the screen (step S317). FIG. 20(e) illustrates an example of a making call relay result screen.

Returning to FIG. 19, in the case of approval, the shared client terminal logs in with the personal account by using the approval information used for receiving the video conference service by the personal account included in the making call relay request (step S318).

Next, when the shared client terminal successfully logs in with the personal account, the shared client terminal makes a call for the destination selected by the user included in the making call relay request (step S319). Upon receiving the call by the personal account from the shared client terminal, the transmission management system 50 makes a call for the destination client terminal (step S320). After receiving a response from the destination client terminal (step S321), the transmission management system 50 transmits the response to the shared client terminal (step S322). The destination client terminal transmits a conference start request to the relay apparatus 30 (step S323).

Upon receiving the response indicating a successful call, the shared client terminal transmits a conference start request to the relay apparatus 30 (step S324), transitions to a conference screen, and starts a video conference with the destination client terminal.

When the conference is ended because of a certain reason, the relay apparatus 30 transmits an end of conference to the shared client terminal (step S325), the shared client terminal logs out from the personal account (step S326), and the end-of-conference notification is displayed for the user (step S327).

When the user acknowledges the end-of-conference notification (press OK) (step S328), the shared client terminal logs in with the shared account (step S329) and displays the destination list for the shared account.

(In the Case where Direct Communication Between Terminals (Bluetooth) is Used)

FIG. 21 and FIG. 22 are sequence diagrams illustrating another process example of an embodiment in which cooperation between a personal client terminal and a shared client terminal is performed by using direct communication between terminals (Bluetooth).

In FIG. 21, first, a user starts up the personal client terminal and the shared client terminal (step S401, S404). The user logs on to the personal client terminal and the shared client terminal by using respective accounts (step S402, S405), and respective destination lists are displayed (step S403, S407). It should be noted that the personal client terminal and the shared client terminal try a Bluetooth pairing (presence check) at any time (step S406).

Next, the user operates the personal client terminal to select a call destination from the destination list (step S408). When the user taps on an icon of the shared client terminal (step S410) in response to the making call confirmation screen display (step S409), the personal client terminal displays a making call relay screen (step S411). At the same time, the personal client terminal transmits to the shared client terminal via the Bluetooth communication, as a making call relay request, approval information (login information, etc.,) for using a video conference service by using a personal account and a call destination selected by the user (step S412).

FIG. 23 illustrates an operation example of the personal client terminal; (a) illustrates a state in which "Mr. A" is selected from the destination list; (b) illustrates a state in which "shared client terminal conference start" is selected for the destination "Mr. A" from "normal conference start", "shared client terminal conference start" (shared client terminal's icon), and "cancel"; and (c) illustrates a state in which the making call relay screen is displayed.

Referring to FIG. 22, upon receiving the making call relay request from the personal client terminal, the shared client terminal transmits a response via the Bluetooth communication indicating whether the making call relay request is approved or disapproved (step S413).

The personal client terminal receives the message from the shared client terminal, and displays on the screen whether the making call relay request is approved or disapproved (step S414). In the case of approval, the personal client terminal logs out from the personal account upon displaying on the screen (step S415). FIG. 23(d) illustrates an example of a making call relay result screen.

Returning to FIG. 22, in the case of approval, the shared client terminal logs in with the personal account by using the approval information used for receiving the video conference service by the personal account included in the making call relay request (step S416).

Next, when the shared client terminal successfully logs in with the personal account, the shared client terminal makes a call for the destination selected by the user included in the making call relay request (step S417). Upon receiving the call by the personal account from the shared client terminal, the transmission management system 50 makes a call for the destination client terminal (step S418). After receiving a response from the destination client terminal (step S419), the transmission management system 50 transmits the response to the shared client terminal (step S420). The destination client terminal transmits a conference start request to the relay apparatus 30 (step S421).

Upon receiving the response indicating a successful call, the shared client terminal transmits a conference start request to the relay apparatus 30 (step S422), transitions to a conference screen, and starts a video conference with the destination client terminal.

When the conference is ended because of a certain reason, the relay apparatus 30 transmits an end of conference to the shared client terminal (step S423), the shared client terminal logs out from the personal account (step S424), and the end-of-conference notification is displayed for the user (step S425).

When the user acknowledges the end-of-conference notification (press OK) (step S426), the shared client terminal logs in with the shared account (step S427) and displays the destination list for the shared account.

(In the Case of Using Location Information)

In the case where the personal client terminal includes a unit for obtaining location information such as a Global Positioning System (GPS), the location information is transmitted to the transmission management system 50 and a shared client terminal, whose location information is registered beforehand and is determined to be near the personal client terminal, can be searched. Further, the transmission management system 50 provides an address of the searched shared client terminal to the personal client terminal and the personal client terminal can transmit a making call relay request to the shared client terminal via the transmission management system 50.

FIG. 24 is a part of a sequence diagram only illustrating that, after start-ups of the terminals, the transmission management system 50 transmits to the personal client terminals addresses of their corresponding near-by shared client terminals. Accordingly, the part of FIG. 24 can be applied to a part of obtaining an address of a shared client terminal by reading a two-dimensional code in FIG. 10 and FIG. 11, and to a part of obtaining an address of a shared client terminal from manually input token strings in FIG. 15 and FIG. 16, respectively. Remaining processes are the same as in FIG. 10, FIG. 11, FIG. 15 and FIG. 16. It should be noted that the process of a random token is not necessary.

Referring to FIG. 24, when the personal client terminal is started (step S501), the personal client terminal estimates its location by using GPS, or the like (step S502).

Further, when the shared client terminal is started (step S503), in the case where a unit for obtaining location information such as a GPS is installed in the shared client terminal, the shared client terminal estimates its location (step S504) and registers the location information of the shared client terminal in the transmission management system 50 (step S505).

It should be noted that, in the case where the unit for obtaining location information is not installed in the shared client terminal, an administrator user resisters the location information of the shared client terminal in the transmission management system 50 via a management utility (step S506, S507).

Afterwards, the personal client terminal transmits with its own location information a request for information of its near-by shared client terminal (step S508).

In response to the request, the transmission management system 50 searches for a shared client terminal whose location is near the personal client terminal based on the registered location information of the shared client terminal (step S509), and, in the case where such a shared client terminal exists, responds to the personal client terminal with the address of the shared client terminal (step S510).

CONCLUSION

As described above, according to an embodiment, it is possible to safely use the dedicated-purpose terminal while using a personal account by a cooperation between a dedicated-purpose terminal and a general-purpose terminal.

It should be noted that the dedicated-purpose terminal may include at least one aspect of different software capability or hardware capability compared with the general-purpose terminal. Further, the dedicated-purpose terminal may not be superior to the general-purpose terminal in all aspects of the hardware capability.

Further, in the embodiment, a video conference terminal is described as an example of a dedicated-purpose terminal, but the dedicated-purpose terminal is not limited to a video conference terminal and may be an Internet Protocol (IP) telephone, an Internet telephone, or the like. Further, the dedicated-purpose terminal may be any one of a smartphone, a tablet terminal, a mobile phone, a car navigation terminal, a wearable computer, a camera, a projector, an electronic whiteboard, a game machine, digital signage, and industrial equipment with communication capability. The wearable computer includes a watch, a head mounted display, or the like. Further, the industrial equipment includes office equipment such as a Multifunction Peripheral/Printer/Product (MFP), medical equipment such as an endoscope, agricultural equipment such as a cultivator, etc.

Further, the general-purpose terminal includes a notebook PC, a smartphone, a tablet terminal, a mobile phone, or a wearable computer.

It should be noted that the management system 50, the relay apparatus 30, and the program providing system 90 in the embodiments may include a single computer, or a plurality of computers to which corresponding units (functions or means) are arbitrarily assigned. Further, in the case where the program providing system 90 includes a single computer, a program transmitted from the program providing system 90 may be divided into a plurality of modules and transmitted, or may be transmitted without being divided into modules. Further, in the case where the program providing system 90 includes a plurality of computers, a plurality of divided modules may be transmitted from the corresponding computers.

The present invention has been described above according to preferred embodiments. The present invention has been described by illustrating specific examples. It should be appreciated that various modifications and changes to the specific examples may be made without departing from the spirit and scope of the present invention defined by accompanied claims. In other words, it should be understood that the present invention is not limited by the specific examples and the accompanying drawings.

CORRESPONDENCE BETWEEN TERMS OF EMBODIMENTS AND TERMS OF CLAIMS

"Shared client terminal" is an example of "first transmission terminal". "Personal client terminal" is an example of "second transmission terminal". "Dedicated-purpose-terminal-and-general-purpose-terminal cooperation unit 1-22" is an example of "accepting unit", "transmission unit", "receiving unit", and "starting unit".

The present application is based on and claims the benefit of priority of Japanese Priority Application No. 2015-054029 filed on Mar. 17, 2015, the entire contents of which are hereby incorporated by reference.

REFERENCE SIGNS LIST

1 transmission system
2 communication network
10, 20 transmission terminal
11 communication unit
12 operation input accepting unit
13 login request unit
14 imaging unit
15a audio input unit
15b audio output unit
16 display control unit
18 delay detection unit
19 storing and reading processing unit
1-20 destination list generation unit
1-21 user authentication accepting unit
1-22 dedicated-purpose-terminal-and-general-purpose-terminal cooperation unit
1000 non-volatile storage unit
1002 volatile storage unit
30 relay apparatus
31 communication unit
32 state detection unit
33 data quality checking unit
34 change quality management unit
35 data quality change unit
39 storing and reading processing unit
3000 non-volatile storage unit
3001 change quality management DB
50 transmission management system
51 communication unit
52 authentication unit
53 state management unit
54 terminal extracting unit
55 terminal state obtaining unit
57 session management unit
58 quality determination unit
59 storing and reading processing unit
60 delay time management unit
62 destination determination unit
5000 non-volatile storage unit
5001 relay apparatus management DB
5002 authentication management DB
5003 terminal management DB
5004 destination list management DB
5005 session management DB
5007 quality management DB
5100 volatile storage unit

The invention claimed is:

1. A transmission system comprising:
a first transmission terminal, and
a second transmission terminal,
wherein the second transmission terminal includes
processing circuitry configured to
accept a destination selection, and
transmit to the first transmission terminal information of the selected destination and personal account information of the second transmission terminal,
wherein the first transmission terminal includes
processing circuitry configured to
receive from the second transmission terminal the destination information and the personal account information of the second transmission terminal, and
start a communication for a videoconferencing service with the destination transmission terminal based on the received information,
wherein the personal account information is approval information for using the videoconferencing service by using the personal account and the approval information includes login information of a user of the second transmission terminal and a random token, which the second transmission terminal obtains from the first transmission terminal, and which is updated periodically by the first transmission terminal.

2. The transmission system according to claim 1, wherein the processing circuitry of the second transmission terminal identifies the first transmission terminal and obtains the random token by taking an image of an identification code of the first transmission terminal displayed on a screen of the first transmission terminal, and performs transmission to the identified first transmission terminal.

3. The transmission system according to claim 1, wherein the processing circuitry of the second transmission terminal identifies the first transmission terminal from token strings manually input based on the token strings for identifying the first transmission terminal displayed on a screen of the first transmission terminal, and performs transmission to the identified first transmission terminal.

4. The transmission system according to claim 1, wherein the processing circuitry of the second transmission terminal performs transmission to the first transmission terminal by using a direct communication between the first transmission terminal and the second transmission terminal.

5. The transmission system according to claim 1, wherein the processing circuitry of the second transmission terminal identifies the first transmission terminal by using a search result of an apparatus configured to manage location information of the first transmission terminal and search for a near-by terminal of the second transmission terminal based on location information of the second transmission terminal, and performs transmission to the identified first transmission terminal.

6. A method for a first transmission terminal and a second transmission terminal, the method comprising:
accepting, by the second transmission terminal, a destination selection;
transmitting, by the second transmission terminal, to the first transmission terminal information of the selected destination and personal account information of the second transmission terminal;
receiving, by the first transmission terminal, from the second transmission terminal the destination information and the personal account information of the second transmission terminal; and
starting, by the first transmission terminal, a communication for a videoconferencing service with the destination transmission terminal based on the received information,
wherein the personal account information is approval information for using the videoconferencing service by using the personal account and the approval information includes login information of a user of the second transmission terminal and a random token, which the second transmission terminal obtains from the first transmission terminal, and which is updated periodically by the first transmission terminal.

7. A non-transitory computer readable recording medium storing a program for causing processing circuitry included in a first transmission terminal and a second transmission terminal to execute steps of:

accepting, by the second transmission terminal, a destination selection;

transmitting, by the second transmission terminal, to the first transmission terminal information of the selected destination and personal account information of the second transmission terminal;

receiving, by the first transmission terminal, from the second transmission terminal the destination information and the personal account information of the second transmission terminal; and starting, by the first transmission terminal, a communication for a videoconferencing service with the destination transmission terminal based on the received information, wherein the personal account information is approval information for using the videoconferencing service by using the personal account and the approval information includes login information of a user of the second transmission terminal and a random token, which the second transmission terminal obtains from the first transmission terminal, and which is updated periodically by the first transmission terminal.

* * * * *